United States Patent
Shi et al.

(10) Patent No.: US 11,096,154 B2
(45) Date of Patent: Aug. 17, 2021

(54) UPLINK CONTROL CHANNEL RESOURCE MAPPING METHOD AND APPARATUS

(71) Applicant: Huawei Technologies Co., Ltd., Shenzhen (CN)

(72) Inventors: Jie Shi, Shenzhen (CN); Chao Li, Beijing (CN); Xingwei Zhang, Beijing (CN); Zhe Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 34 days.

(21) Appl. No.: 16/576,224

(22) Filed: Sep. 19, 2019

(65) Prior Publication Data

US 2020/0037298 A1 Jan. 30, 2020

Related U.S. Application Data

(63) Continuation of application No. PCT/CN2018/080361, filed on Mar. 23, 2018.

(30) Foreign Application Priority Data

Mar. 23, 2017 (CN) .......................... 201710180018.8

(51) Int. Cl.
*H04W 72/04* (2009.01)
*H04L 1/18* (2006.01)

(52) U.S. Cl.
CPC ....... *H04W 72/0406* (2013.01); *H04L 1/1812* (2013.01); *H04W 72/0446* (2013.01)

(58) Field of Classification Search
CPC . H04W 72/0446; H04W 84/12; H04W 84/18; H04W 28/04; H04W 28/06
USPC ........................................................ 370/336
See application file for complete search history.

(56) References Cited

U.S. PATENT DOCUMENTS

| 10,863,488 B2 * | 12/2020 | Hwang ................. H04L 5/0055 |
| 2012/0127938 A1 | 5/2012 | Lv et al. |
| 2012/0127948 A1 * | 5/2012 | Chung .................. H04L 5/0053 370/329 |
| 2017/0111894 A1 * | 4/2017 | Chen ..................... H04W 76/27 |

(Continued)

FOREIGN PATENT DOCUMENTS

| CN | 101971681 A | 2/2011 |
| CN | 103313403 A | 9/2013 |
| CN | 103369675 A | 10/2013 |
| CN | 106358296 A | 1/2017 |

(Continued)

OTHER PUBLICATIONS

3GPP TSG RAN WG1 #88, R1-1702983, Athens, Greece Feb. 13-17, 2017, Agenda item: 8.1.3.2.3, Source: Samsung, Title: Resource Allocation for PUCCH. (Year: 2017).*

(Continued)

*Primary Examiner* — Pankaj Kumar
*Assistant Examiner* — Sanjay K Dewan
(74) *Attorney, Agent, or Firm* — Slater Matsil, LLP

(57) ABSTRACT

An uplink control channel resource mapping method performed by a terminal device, the method including obtaining, by a terminal device, resource configuration information of an uplink control channel, and determining, by the terminal device according to the resource configuration information, information about a time domain location in at least one of a slot in which the uplink control channel is located or a subframe in which the uplink control channel is located.

15 Claims, 5 Drawing Sheets

(56) References Cited

U.S. PATENT DOCUMENTS

| | | | |
|---|---|---|---|
| 2017/0245265 A1* | 8/2017 | Hwang | H04L 27/2601 |
| 2017/0373741 A1* | 12/2017 | Yang | H04L 1/18 |
| 2018/0227103 A1* | 8/2018 | Wang | H04W 72/0413 |
| 2019/0104515 A1* | 4/2019 | Li | H04W 72/0413 |
| 2019/0215823 A1* | 7/2019 | Kim | H04L 1/0031 |
| 2020/0053777 A1* | 2/2020 | Babaei | H04W 72/042 |
| 2020/0067676 A1* | 2/2020 | Yi | H04L 5/0091 |

FOREIGN PATENT DOCUMENTS

| | | | | |
|---|---|---|---|---|
| JP | WO 2013/099269 A1 * | 7/2013 | | H04W 72/04 |
| WO | 2016122756 A1 | 8/2016 | | |
| WO | 2016122782 A1 | 8/2016 | | |
| WO | 2016159730 A1 | 10/2016 | | |
| WO | 2013099269 A1 | 7/2020 | | |

OTHER PUBLICATIONS

"On PUCCH with Simultaneous Data Transmission," Source: Ericsson, Agenda Item: 8.1.3.2.4, Document for: Discussion and Decision, 3GPP TSG RAN WG1 Meeting #88, R1-1703297, Feb. 13-17, 2017, 3 pages.

"Discussion on sPUCCH Design," Agenda Item: 6.2.10.2.3, Source: Huawei, HiSilicon, Document: Discussion and Decision, 3GPP TSG RAN WG1 Meeting #87, R1-1611160, Nov. 14-18, 2016, 6 pages.

"Design of Short NR-PUCCH Format," Agenda Item: 8.1.3.2.1, Source: LG Electronics, Document for: Discussion and Decision, 3GPP TSG RAN WG1 Meeting #88, R1-1702479, Feb. 13-17, 2017, 8 pages.

"Configuration of Long NR-PUCCH Resource," Agenda Item: 8.1.3.2.2, Source: LG Electronics, Document for: Discussion and Decision, 3GPP TSG RAN WG1 Meeting #88, R1-1702482, Feb. 13-17, 2017, 6 pages.

"Resource Allocation for PUCCH," Agenda item: 8.1.3.2.3, Source: Qualcomm Incorporated, Document for: Discussion/Decision, 3GPP TSG-RAN WG1 #88, R1-1702634, Feb. 13-17, 2017, 2 pages.

"Resource Allocation for PUCCH," Agenda Item: 8.1.3.2.3, Source: Samsung, Document for: Discussion and Decision, 3GPP TSG RAN WG1#88, R1-1702983, Feb. 13-17, 2017, 4 pages.

* cited by examiner

UPLINK CONTROL CHANNEL RESOURCE MAPPING METHOD AND APPARATUS

CROSS-REFERENCE TO RELATED APPLICATIONS

This application is a continuation of International Application No. PCT/CN2018/080361, filed on Mar. 23, 2018, which claims priority to Chinese Patent Application No. 201710180018.8, filed on Mar. 23, 2017. The disclosures of the aforementioned applications are hereby incorporated by reference in their entireties.

TECHNICAL FIELD

The present disclosure relates to the field of communications technologies, and in particular, to an uplink control channel resource mapping method and apparatus.

BACKGROUND

A 5th generation (5G) mobile communications technology communications system uses an orthogonal frequency division multiplexing (OFDM) technology. An eNodeB (eNB) sends information to user equipment (UE) by using a limited quantity of OFDM symbols. In the 5G communications system, when sending information to the UE, the eNB may send the information within a slot (for example, a slot o), and may further send higher-priority service data within a mini-slot included in the slot. After receiving the information sent by the eNB, the UE needs to return a feedback for data (for example, data 1) sent by the eNB in the slot o and a feedback for data (for example, data 2) sent by the eNB in the mini-slot. In the 5G communications system, after receiving the information sent by the eNB, the UE feeds back information such as uplink control information (UCI) to the eNB through a physical uplink control channel (PUCCH).

In the prior art, a frequency domain resource occupied by the PUCCH through which the UE feeds back the UCI is placed in two segments of uplink system bandwidth, and a location of the frequency domain resource occupied by the PUCCH in the uplink system bandwidth is related to downlink control information (DCI) corresponding to information included in the PUCCH. However, in the 5G communications system, when the eNB sends information to the UE, there is no longer only one piece of DCI within one slot, but there may be a plurality of pieces of DCI within one slot, including DCI corresponding to a mini-slot. In the prior art, frequency domain resources occupied by PUCCHs of a plurality of pieces of DCI corresponding to a plurality of slots are placed in a same location within the uplink system bandwidth. This causes a PUCCH resource location usage collision, and further causes an error when the UE transmits UCI, thereby resulting in a high information transmission error rate and low applicability.

SUMMARY

This application provides an uplink control channel resource mapping method and apparatus, to avoid a collision in occupancy of an uplink control channel resource and improve accuracy of transmitting uplink control information.

According to a first aspect, an uplink control channel resource mapping method is provided. The method may include obtaining, by a terminal device, resource configuration information of an uplink control channel, where the resource configuration information includes a parameter corresponding to first information, the first information includes at least one of subband information of the terminal device and second information, and the second information includes at least one of the following information: time domain information and/or frequency domain information of a resource in which downlink control information (DCI) of the terminal device is located, slot type information of the terminal device, and time domain information and/or frequency domain information of a resource in which a downlink shared channel data packet of the terminal device is located, and determining, by the terminal device, an uplink control channel resource based on the resource configuration information, and sending uplink control information on the uplink control channel resource.

Optionally, the resource configuration information includes resource offset information, and the resource offset information includes resource offset information corresponding to the time domain information and/or frequency domain information of the resource in which the DCI of the terminal device is located, and the determining, by the terminal device, an uplink control channel resource based on the resource configuration information includes determining, by the terminal device, the uplink control channel resource based on the resource offset information.

Optionally, the resource offset information corresponding to the time domain information and/or frequency domain information of the resource in which the DCI of the terminal device is located includes first resource offset information corresponding to information about an orthogonal frequency division multiplexing (OFDM) symbol occupied by the DCI, or second resource offset information corresponding to information about a subcarrier spacing (SCS) occupied by the DCI, or third resource offset information corresponding to information about an SCS in which an OFDM symbol occupied by the DCI is located.

Optionally, the resource configuration information includes resource offset information, and the resource offset information includes resource offset information corresponding to the slot type information of the terminal device, and the determining, by the terminal device, an uplink control channel resource based on the resource configuration information includes determining, by the terminal device, the uplink control channel resource based on the resource offset information.

Optionally, the resource configuration information includes resource offset information, and the resource offset information includes resource offset information corresponding to the time domain information and/or frequency domain information of the resource in which the downlink shared channel data packet of the terminal device is located, and the determining, by the terminal device, an uplink control channel resource based on the resource configuration information includes determining, by the terminal device, the uplink control channel resource based on the resource offset information.

Optionally, the determining, by the terminal device, the uplink control channel resource based on the resource offset information includes obtaining, by the terminal device, a resource offset based on the resource offset information, and determining the uplink control channel resource based on an index value of a resource unit carrying the DCI.

Optionally, the determining, by the terminal device, the uplink control channel resource based on the resource offset information includes obtaining, by the terminal device, the resource offset based on the resource offset information, and determining the uplink control channel resource based on a frequency domain resource index that is indicated by an access network device and that is of an uplink control channel used for transmitting UCI.

Optionally, the resource configuration information further includes frequency domain resource index information, where the frequency domain resource index information includes frequency domain resource index information corresponding to the slot type information of the terminal device, or frequency domain resource index information corresponding to the time domain information and/or frequency domain information of the resource in which the downlink shared channel data packet of the terminal device is located, or frequency domain resource index information corresponding to the subband information of the terminal device, and the determining, by the terminal device, an uplink control channel resource based on the resource configuration information includes determining, by the terminal device, the uplink control channel resource based on the frequency domain resource index information.

Optionally, the resource unit index value includes a resource unit index value of first DCI, or a resource unit index value of second DCI, where the DCI of the terminal device is carried by the first DCI and/or the second DCI.

Optionally, the resource unit index value includes a resource unit index value of a physical downlink shared channel PDSCH carrying the DCI of the terminal device, or a resource unit index value of a short PDSCH carrying the DCI, where the resource unit index value includes a system-level resource unit index value, or a subband-level resource unit index value.

Optionally, the resource unit index value is determined based on a resource unit index value of first DCI and a resource unit index value of second DCI, where the DCI of the terminal device is carried by the first DCI and/or the second DCI.

Optionally, the subband information of the terminal device includes information about at least one subband of an uplink UL frequency domain of the terminal device, and information about at least one subband of a downlink DL frequency domain of the terminal device, and before the determining, by the terminal device, an uplink control channel resource based on the resource configuration information, the method further includes obtaining, by the terminal device, a mapping relationship between the subband of the UL frequency domain corresponding to the subband information and the subband of the DL frequency domain corresponding to the subband information, and determining an operating UL subband of the terminal device based on the mapping relationship.

Optionally, after the determining an operating UL subband of the terminal device based on the mapping relationship, the method further includes obtaining a subband resource offset of the operating UL subband of the terminal device, so as to determine the uplink control channel resource based on the resource configuration information and the subband resource offset, where the subband resource offset is used to determine an offset of a resource block RB used in the subband of the UL frequency domain, and an offset of the resource is the offset of the resource block.

Optionally, the obtaining a subband resource offset of the operating UL subband of the terminal device based on the mapping relationship includes if at least two subbands of the DL frequency domain are mapped to a same subband of the UL frequency domain, obtaining a subband resource offset associated with a subband of the DL frequency domain.

Optionally, the subband information of the terminal device includes information about at least one subband of a UL frequency domain of the terminal device, before the determining, by the terminal device, an uplink control channel resource based on the resource configuration information, the method further includes obtaining, by the terminal device, preconfigured subband configuration information or subband configuration information sent by an access network device, and determining an operating UL subband of the terminal device based on the subband configuration information, and the determining, by the terminal device, an uplink control channel resource based on the resource configuration information includes determining, by the terminal device based on a predefined uplink control channel resource calculation manner and the resource configuration information, an uplink control channel resource corresponding to the operating UL subband of the terminal device.

Optionally, the subband information of the terminal device includes information about at least one subband of a DL frequency domain of the terminal device, before the determining, by the terminal device, an uplink control channel resource based on the resource configuration information, the method further includes determining, by the terminal device, a subband resource offset based on an operating DL subband of the terminal device, where the subband resource offset is used to determine a UL frequency domain resource corresponding to the operating DL subband of the terminal device, and the determining, by the terminal device, an uplink control channel resource based on the resource configuration information includes determining, by the terminal device based on the resource configuration information and the subband resource offset, an uplink control channel resource corresponding to the operating DL subband of the terminal device.

Optionally, each subband included in the DL frequency domain of the terminal device corresponds to a subband resource offset, and the determining, by the terminal device, a subband resource offset based on an operating DL subband of the terminal device includes obtaining, by the terminal device, a subband resource offset corresponding to the operating DL subband of the terminal device as the subband resource offset.

Optionally, each subband included in the DL frequency domain of the terminal device corresponds to a subband resource offset, and the determining, by the terminal device, a subband resource offset based on an operating DL subband of the terminal device includes obtaining, by the terminal device, subband resource offsets of the operating DL subband of the terminal device and each subband before the operating DL subband of the terminal device in the DL frequency domain, and determining a cumulative value of the obtained subband resource offsets as the subband resource offset.

Optionally, the subband of the DL frequency domain and/or the subband of the UL frequency domain are/is obtained through allocation based on content of the UCI of the terminal device and/or a slot type of the terminal device.

Optionally, the resource configuration information further includes code division multiplexing information, where the code division multiplexing information includes a code division multiplexing resource corresponding to information about an orthogonal frequency division multiplexing (OFDM) symbol occupied by the DCI, or a code division multiplexing resource corresponding to a slot type of the terminal device, the code division multiplexing resource includes one or a combination of the following: information about a reference signal sequence carrying the UCI, cyclic offset information of the reference signal sequence, and information about an orthogonal sequence used in time domain and/or frequency domain, and the determining, by the terminal device, an uplink control channel resource based on the resource configuration information includes determining, by the terminal device based on the code division multiplexing information, a manner of sending the uplink control channel resource.

According to a second aspect, an uplink control channel resource mapping method is provided. The method may include obtaining, by a terminal device, resource configuration information of an uplink control channel, and determining, by the terminal device based on the resource configuration information, information about a time domain location in a slot or a subframe in which the uplink control channel is located.

The information about the time domain location in the slot or the subframe in which the uplink control channel is located may further include the following case: time domain location information of the slot and time domain location information of an OFDM symbol in the slot.

Optionally, the resource configuration information includes indication information for searching for a PUCCH, and the determining, by the terminal device based on the resource configuration information, information about a time domain location in a slot or a subframe in which the uplink control channel is located includes searching, by the terminal device based on the indication information, for an uplink control channel that is closest to a current moment and after the current moment and that satisfies a channel requirement, and determining a time domain location in a slot or a subframe in which the uplink control channel is located, where the current moment is a moment when the terminal device receives DCI delivered by an access network device, or a moment when the terminal device parses out a downlink shared channel data packet.

Optionally, the resource configuration information includes a channel type of the uplink control channel, and the channel type of the uplink control channel includes a short uplink control channel and/or a long uplink control channel, and the determining, by the terminal device based on the resource configuration information, information about a time domain location in a slot or a subframe in which the uplink control channel is located includes searching, by the terminal device, for an uplink control channel that is closest to a current moment and after the current moment and that satisfies a requirement of the channel type, and determining a time domain location in a slot or a subframe in which a found short uplink control channel and/or a found long uplink control channel are/is located, where the current moment is a moment when the terminal device receives DCI delivered by an access network device, or a moment when the terminal device parses out a downlink shared channel data packet.

Optionally, the resource configuration information includes bit information of the uplink control channel, the bit information is used to indicate that an uplink control channel used for transmitting UCI is a $k^{th}$ uplink control channel, the $k^{th}$ uplink control channel includes a short uplink control channel and/or a long uplink control channel, and k is an integer greater than or equal to 1, and the determining, by the terminal device based on the resource configuration information, information about a time domain location in a slot or a subframe in which the uplink control channel is located includes searching, by the terminal device, for a $k^{th}$ short uplink control channel and/or a $k^{th}$ long uplink control channel after or starting from a current moment, and determining a time domain location in a slot or a subframe in which a found short uplink control channel and/or a found long uplink control channel are/is located, where the current moment is a moment when the terminal device receives DCI delivered by an access network device, or a moment when the terminal device parses out a downlink shared channel data packet.

Optionally, the resource configuration information includes timing information of the following: a time domain location at which a first hybrid automatic repeat request (HARQ) process receives a downlink shared channel data packet, and a time domain location of an uplink control channel at which UCI of the downlink shared channel data packet is fed back, and the determining, by the terminal device based on the resource configuration information, information about a time domain location in a slot or a subframe in which the uplink control channel is located includes determining, by the terminal device based on the timing information and a first time domain location at which the first HARQ process receives a first downlink shared channel data packet, a time domain location of an uplink control channel at which UCI of the first downlink shared channel data packet is fed back, and determining, by the terminal device, a difference between the first time domain location and a second time domain location at which a second HARQ process receives a second downlink shared channel data packet, and determining, based on the difference and the time domain location of the uplink control channel at which the UCI of the first downlink shared channel data packet is fed back, a time domain location of an uplink control channel at which UCI of the second downlink shared channel data packet is to be fed back, as the information about the time domain location in the slot or the subframe in which the uplink control channel is located.

Optionally, the resource configuration information includes a reference timing relationship between a time domain location at which a downlink shared channel data packet is received and a time domain location of an uplink control channel at which UCI of the downlink shared channel data packet is fed back, where the reference timing relationship is used to indicate a time domain location of an uplink control channel at which UCI of a downlink shared channel data packet is fed back and that is corresponding to a time domain location at which a HARQ process receives the downlink shared channel data packet, and the determining, by the terminal device based on the resource configuration information, information about a time domain location in a slot or a subframe in which the uplink control channel is located includes determining, by the terminal device, a time domain location at which a downlink shared channel data packet is received, and determining, by the terminal device based on the reference timing relationship and the time domain location, a time domain location of an uplink control channel at which UCI of the downlink shared channel data packet is to be fed back, as the information about the time domain location in the slot or the subframe in which the uplink control channel is located.

Optionally, the resource configuration information includes a reference timing relationship between a time domain location at which a downlink shared channel data packet is received and a time domain location of an uplink control channel at which UCI of the downlink shared channel data packet is fed back, and a preconfigured time domain location offset or a time domain location offset sent by an access network device, where the reference timing relationship is used to indicate a time domain location of an uplink control channel at which UCI of a downlink shared channel data packet is fed back and that is corresponding to a time domain location at which a HARQ process receives the downlink shared channel data packet, and the determining, by the terminal device based on the resource configuration information, information about a time domain location in a slot or a subframe in which the uplink control channel is located includes determining, by the terminal device, a time domain location at which a downlink shared channel data packet is received, and determining, by the terminal device based on the reference timing relationship and the time domain location offset, a second time domain location of an uplink control channel at which UCI of the downlink shared channel data packet is to be fed back and that is corresponding to a first time domain location at which the downlink shared channel data packet is received, as the information about the time domain location in the slot or the subframe in which the uplink control channel is located.

Optionally, the reference timing relationship is a time domain location relationship between a time domain location at which a specified HARQ process receives a downlink shared channel data packet and a time domain location of an uplink control channel at which UCI of the downlink shared channel data packet is fed back, where the specified HARQ process is a preconfigured HARQ process, or a HARQ process that is indicated by a HARQ identity ID sent by an access network device.

The timing concept provided in this application may include timing information at an OFDM symbol level, at a slot and OFDM symbol level, at a subframe and OFDM level, at a subframe, slot, and OFDM symbol level, or the like. The timing information may be at least one of a subframe spacing, a slot spacing, or an OFDM symbol spacing, and is not limited herein.

The at least one of a subframe spacing, a slot spacing, or an OFDM symbol spacing specifically includes an OFDM symbol spacing, or a subframe spacing and a slot spacing, or a subframe spacing, a slot spacing, and an OFDM symbol spacing, or a slot spacing and an OFDM symbol spacing, or a subframe spacing and an OFDM symbol spacing.

Optionally, the resource configuration information further includes information about a hybrid automatic repeat request (HARQ) ID associated with time domain information of the uplink control channel for transmitting the UCI, and the determining, by the terminal device based on the resource configuration information, information about a time domain location in a slot or a subframe in which the uplink control channel is located includes determining, by the terminal device, time domain location information of an uplink control channel of a HARQ process indicated by the HARQ ID, as the information about the time domain location in the slot or the subframe in which the uplink control channel is located.

Optionally, the resource configuration information further includes bit indication information of the time domain location in the slot or the subframe in which the uplink control channel is located, and the determining, by the terminal device based on the resource configuration information, information about a time domain location in a slot or a subframe in which the uplink control channel is located includes searching, by the terminal device based on the bit indication information, a preconfigured uplink control channel location set for the time domain location, indicated by the bit indication information, in the slot or the subframe in which the uplink control channel is located.

Optionally, the uplink control channel location set includes a time domain location and/or a frequency domain location of at least one uplink control channel of at least one slot, where a time domain location or a frequency domain location of each uplink control channel is represented by a PUCCH location element in the uplink control channel location set.

Optionally, the uplink control channel location set includes at least one uplink control channel location element, where each uplink control channel location element represents a time domain location and/or a frequency domain location of one uplink control channel, and a time domain location of the uplink control channel includes a time domain location of a short uplink control channel or a time domain location of a long uplink control channel.

According to a third aspect, an uplink control channel resource mapping method is provided. The method may include obtaining, by a terminal device, resource configuration information of an uplink control channel, where the resource configuration information includes information about a resource occupied by the uplink control channel on an uplink shared channel resource, and the resource information is used to instruct the terminal device to send uplink control information UCI on a specified quantity of orthogonal frequency division multiplexing (OFDM) symbols at one end or at two ends of a frequency domain of the uplink shared channel resource, or used to instruct the terminal device to send UCI on all OFDM symbols at one end or at two ends of a frequency domain of the uplink shared channel resource, and determining, by the terminal device based on the resource configuration information, information about a time domain location in a slot or a subframe in which the uplink control channel is located.

Information described in this application, for example, the resource configuration information, an offset related to an uplink control channel type, a subband resource offset, or subband configuration information, may be preconfigured information, or may be information delivered by an access network device to the terminal device by using higher layer signaling, or may be information sent by an access network device to the terminal device in a manner in which the access network device sends a set by using higher layer signaling and then one or more elements are selected from the set for DCI.

The UCI in this application includes at least one of the following information: HARQ feedback information (including a HARQ-ACK and/or a HARQ-NACK), channel state information reference signal (CSI-RS) information, buffer status report information, beam ID information, and scheduling request information. The CSI-RS information includes at least one of the following information: channel state indication information, channel quality indication information, precoding matrix indication information, rank indication information, channel state information resource indication information, and channel state information interference measurement information.

The HARQ feedback information in this application is feedback information based on one or more transport blocks, or feedback information based on one or more code blocks, or feedback information based on a combination of a transport block and a code block. The code block belongs to a transport block sent along with the code block, or a plurality of code blocks come from one transport block. Alternatively, the code block does not belong to a transport block sent along with the code block, or a plurality of code blocks come from different transport blocks.

Bit indication information described in this application may be sent to UE by using higher layer signaling, or sent to UE by using DCI, or sent to UE in a manner in which a set is sent by using higher layer signaling and then one or more elements are selected from the set for DCI. The higher layer signaling in this embodiment of the present disclosure includes at least one of radio resource control (RRC) signaling, media access control (MAC) signaling, broadcast information, or system information.

A time domain resource index and/or a frequency domain resource index provided in this application may be a resource index set configured by using higher layer signaling, and an access network device dynamically selects one element from the resource index set based on DCI of the terminal device, and delivers the element to the terminal device. Alternatively, the frequency domain resource index is a frequency domain resource index delivered by the access network device to the terminal device by using higher layer signaling. Alternatively, the terminal device may obtain the frequency domain resource index in another manner of communication with the access network device. This may be specifically determined based on an actual application scenario, and is not limited herein.

According to a fourth aspect, an uplink control channel resource mapping method is provided. The method may include determining, by an access network device, resource configuration information based on first information, and sending, by the access network device, the resource configuration information to a terminal device, where the resource configuration information is used to instruct the terminal device to determine an uplink control channel resource based on the resource configuration information, and send uplink control information on the uplink control channel resource.

The resource configuration information includes a parameter corresponding to the first information, the first information includes at least one of subband information of the terminal device and second information, and the second information includes at least one of the following information: time domain information and/or frequency domain information of a resource in which downlink control information (DCI) of the terminal device is located, slot type information of the terminal device, and time domain information and/or frequency domain information of a resource in which a downlink shared channel data packet of the terminal device is located.

Optionally, the resource configuration information includes resource offset information, and the resource offset information includes resource offset information corresponding to the time domain information and/or frequency domain information of the resource in which the DCI of the terminal device is located.

Optionally, the resource offset information corresponding to the time domain information and/or frequency domain information of the resource in which the DCI of the terminal device is located includes first resource offset information corresponding to information about an orthogonal frequency division multiplexing (OFDM) symbol occupied by the DCI, or second resource offset information corresponding to information about a subcarrier spacing (SCS) occupied by the DCI, or third resource offset information corresponding to information about an SCS in which an OFDM symbol occupied by the DCI is located.

Optionally, the resource configuration information includes resource offset information, and the resource offset information includes resource offset information corresponding to the slot type information of the terminal device.

Optionally, the resource configuration information includes resource offset information, and the resource offset information includes resource offset information corresponding to the time domain information and/or frequency domain information of the resource in which the downlink shared channel data packet of the terminal device is located.

Optionally, the method further includes sending, by the access network device, downlink control information to the terminal device, so that the terminal device obtains a resource unit index value of a time domain resource of the downlink control information.

Optionally, the resource unit index value includes a resource unit index value of first DCI, or a resource unit index value of second DCI, where the DCI of the terminal device is carried by the first DCI and/or the second DCI.

Optionally, the resource unit index value includes a resource unit index value of a physical downlink shared channel PDSCH carrying the DCI of the terminal device, or a resource unit index value of a short PDSCH carrying the DCI, where the resource unit index value includes a system-level resource unit index value, or a subband-level resource unit index value.

Optionally, the resource unit index value is determined based on a resource unit index value of first DCI and a resource unit index value of second DCI, where the DCI of the terminal device is carried by the first DCI and/or the second DCI.

Optionally, the method further includes sending, by the access network device to the terminal device, a resource unit index value of a frequency domain resource of an uplink control channel used for transmitting UCI.

Optionally, the frequency domain resource index information includes frequency domain resource index information corresponding to the slot type information of the terminal device, or frequency domain resource index information corresponding to the time domain information and/or frequency domain information of the resource in which the downlink shared channel data packet of the terminal device is located, or frequency domain resource index information corresponding to the subband information of the terminal device.

The subband information of the terminal device includes information about at least one subband of an uplink UL frequency domain of the terminal device, and information about at least one subband of a downlink DL frequency domain of the terminal device, and the access network device sends, to the terminal device, a mapping relationship between the subband of the UL frequency domain corresponding to the subband information and the subband of the DL frequency domain corresponding to the subband information, to instruct the terminal device to determine, based on the mapping relationship, an operating UL subband of the terminal device.

Optionally, the method further includes sending, by the access network device, a subband resource offset of an operating UL subband of the terminal device to the terminal device, to instruct the terminal device to determine, based on the resource configuration information and the subband resource offset, the uplink control channel resource, where the subband resource offset is used to determine an offset of a resource block RB used in the subband of the UL frequency domain.

Optionally, at least two subbands of the DL frequency domain are mapped to a same subband of the UL frequency domain, and the access network device sends a subband resource offset associated with a subband of the DL frequency domain to the terminal device.

Optionally, the subband information of the terminal device includes information about at least one subband of a UL frequency domain of the terminal device, and the method further includes sending, by the access network device, subband configuration information to the terminal device, to instruct the terminal device to determine an operating UL subband of the terminal device based on the subband configuration information, and determine, based on a predefined uplink control channel resource calculation manner and the resource configuration information, an uplink control channel resource corresponding to the operating UL subband of the terminal device.

Optionally, the subband information of the terminal device includes information about at least one subband of a DL frequency domain of the terminal device, and the method further includes sending, by the access network device, a subband resource offset of an operating DL subband of the terminal device to the terminal device, where the subband resource offset is used to determine a UL frequency domain resource corresponding to the operating DL subband of the terminal device.

Optionally, each subband included in the DL frequency domain of the terminal device corresponds to a subband resource offset, and the method further includes obtaining, by the access network device from the terminal device, a subband resource offset corresponding to the operating DL subband of the terminal device as the subband resource offset, or sending, by the access network device to the terminal device, subband resource offsets of the operating DL subband of the terminal device and each subband before the operating DL subband of the terminal device in the DL frequency domain, so that the terminal device determines a cumulative value of the obtained subband resource offsets as the subband resource offset.

Optionally, the subband of the DL frequency domain and/or the subband of the UL frequency domain are/is obtained through allocation based on content of the UCI of the terminal device and/or a slot type of the terminal device.

Optionally, the resource configuration information further includes code division multiplexing information, where the code division multiplexing information includes a code division multiplexing resource corresponding to information about an orthogonal frequency division multiplexing (OFDM) symbol occupied by the DCI, or a code division multiplexing resource corresponding to a slot type of the terminal device, and the code division multiplexing resource includes one or a combination of the following: information about a reference signal sequence carrying the UCI, cyclic offset information of the reference signal sequence, and information about an orthogonal sequence used in time domain and/or frequency domain.

This application further provides an uplink control channel resource mapping method. The method may include determining, by an access network device, resource configuration information of an uplink control channel, and sending, by the access network device, the resource configuration information to a terminal device, where the resource configuration information is used to indicate information about a time domain location in a slot or a subframe in which the uplink control channel is located.

Optionally, the resource configuration information includes indication information for searching for a PUCCH, and the indication information is used to instruct the terminal device to search for an uplink control channel that is closest to a current moment and after the current moment and that satisfies a channel requirement, and determine a time domain location in a slot or a subframe in which the uplink control channel is located, where the current moment is a moment when the terminal device receives DCI delivered by the access network device, or a moment when the terminal device parses out a downlink shared channel data packet.

Optionally, the resource configuration information includes a channel type of the uplink control channel, and the channel type of the uplink control channel includes a short uplink control channel and/or a long uplink control channel, and the resource configuration information is used to instruct the terminal device to search for an uplink control channel that is closest to a current moment and after the current moment and that satisfies a requirement of the channel type, and determine a time domain location in a slot or a subframe in which a found short uplink control channel and/or a found long uplink control channel are/is located, where the current moment is a moment when the terminal device receives DCI delivered by the access network device, or a moment when the terminal device parses out a downlink shared channel data packet.

Optionally, the resource configuration information includes bit information of the uplink control channel, the bit information is used to indicate that an uplink control channel used for transmitting UCI is a $k^{th}$ uplink control channel, the $k^{th}$ uplink control channel includes a short uplink control channel and/or a long uplink control channel, and k is an integer greater than or equal to 1, and the resource configuration information is used to instruct the terminal device to search for a $k^{th}$ short uplink control channel and/or a $k^{th}$ long uplink control channel after or starting from a current moment, and determine a time domain location in a slot or a subframe in which a found short uplink control channel and/or a found long uplink control channel are/is located, where the current moment is a moment when the terminal device receives DCI delivered by the access network device, or a moment when the terminal device parses out a downlink shared channel data packet.

Optionally, the resource configuration information includes timing information of the following: a time domain location at which a first hybrid automatic repeat request (HARQ) process receives a downlink shared channel data packet, and a time domain location of an uplink control channel at which UCI of the downlink shared channel data packet is fed back.

Optionally, the resource configuration information includes a reference timing relationship between a time domain location at which a downlink shared channel data packet is received and a time domain location of an uplink control channel at which UCI of the downlink shared channel data packet is fed back, where the reference timing relationship is used to indicate a time domain location of an uplink control channel at which UCI of a downlink shared channel data packet is fed back and that is corresponding to a time domain location at which a HARQ process receives the downlink shared channel data packet.

Optionally, the resource configuration information includes a reference timing relationship between a time domain location at which a downlink shared channel data packet is received and a time domain location of an uplink control channel at which UCI of the downlink shared channel data packet is fed back, where the reference timing relationship is used to indicate a time domain location of an uplink control channel at which UCI of a downlink shared channel data packet is fed back and that is corresponding to a time domain location at which a HARQ process receives the downlink shared channel data packet, and the method further includes sending, by the access network device, a time domain location offset to the terminal device, where the time domain location offset is used to instruct the terminal device to determine, based on the reference timing relationship and the time domain location offset, a time domain location of an uplink control channel at which UCI of a downlink shared channel data packet is to be fed back and that is corresponding to a time domain location at which the downlink shared channel data packet is received, as the information about the time domain location in the slot or the subframe in which the uplink control channel is located.

Optionally, the reference timing relationship is a time domain location relationship between a time domain location at which a specified HARQ process receives a downlink shared channel data packet and a time domain location of an uplink control channel at which UCI of the downlink shared channel data packet is fed back, where the specified HARQ process is a preconfigured HARQ process, or a HARQ process that is indicated by a HARQ identity ID sent by an access network device.

Optionally, the resource configuration information further includes information about a hybrid automatic repeat request (HARQ) ID associated with time domain information of the uplink control channel for transmitting the UCI, and the HARQ ID information is used to instruct the terminal device to determine time domain location information of an uplink control channel of a HARQ process indicated by the HARQ ID, as the information about the time domain location in the slot or the subframe in which the uplink control channel is located.

Optionally, the resource configuration information further includes bit indication information of the time domain location in the slot or the subframe in which the uplink control channel is located, and the bit indication information is used to instruct the terminal device to search a preconfigured uplink control channel location set for the time domain location, indicated by the bit indication information, in the slot or the subframe in which the uplink control channel is located.

Optionally, the uplink control channel location set includes a time domain location and/or a frequency domain location of at least one uplink control channel of at least one slot, where a time domain location or a frequency domain location of each uplink control channel is represented by an uplink control channel location element in the uplink control channel location set.

Optionally, the uplink control channel location set includes at least one uplink control channel location element, where each uplink control channel location element represents a time domain location and/or a frequency domain location of one uplink control channel, and a time domain location of the uplink control channel includes a time domain location of a short uplink control channel or a time domain location of a long uplink control channel.

Optionally, the resource configuration information includes information about a resource occupied by the uplink control channel on an uplink shared channel resource, and the resource information is used to instruct the terminal device to send uplink control information UCI on a specified quantity of orthogonal frequency division multiplexing (OFDM) symbols at one end or at two ends of a frequency domain of the uplink shared channel resource, or used to instruct the terminal device to send UCI on all OFDM symbols at one end or at two ends of a frequency domain of the uplink shared channel resource.

This application further provides an uplink control channel resource mapping method. The method may include determining, by an access network device, resource configuration information of an uplink control channel, where the resource configuration information includes information about a resource occupied by the uplink control channel on an uplink shared channel resource, and the resource information is used to instruct a terminal device to send uplink control information UCI on a specified quantity of orthogonal frequency division multiplexing (OFDM) symbols at one end or at two ends of a frequency domain of the uplink shared channel resource, or used to instruct the terminal device to send UCI on all OFDM symbols at one end or at two ends of a frequency domain of the uplink shared channel resource, and sending, by the access network device, the resource configuration information to the terminal device, to instruct the terminal device to determine, based on the resource configuration information, information about a time domain location in a slot or a subframe in which the uplink control channel is located.

According to a fifth aspect, a terminal device is provided. The terminal device may include an obtaining module, configured to obtain resource configuration information of an uplink control channel, where the resource configuration information includes a parameter corresponding to first information, the first information includes at least one of subband information of the terminal device and second information, and the second information includes at least one of the following information: time domain information and/or frequency domain information of a resource in which downlink control information (DCI) of the terminal device is located, slot type information of the terminal device, and time domain information and/or frequency domain information of a resource in which a downlink shared channel data packet of the terminal device is located, and a determining module, configured to determine an uplink control channel resource based on the resource configuration information obtained by the obtaining module, and send uplink control information on the uplink control channel resource.

Optionally, the resource configuration information includes resource offset information, and the resource offset information includes resource offset information corresponding to the time domain information and/or frequency domain information of the resource in which the DCI of the terminal device is located, and the determining module is configured to determine the uplink control channel resource based on the resource offset information.

Optionally, the resource offset information corresponding to the time domain information and/or frequency domain information of the resource in which the DCI of the terminal device is located includes first resource offset information corresponding to information about an orthogonal frequency division multiplexing (OFDM) symbol occupied by the DCI, or second resource offset information corresponding to information about a subcarrier spacing (SCS) occupied by the DCI, or third resource offset information corresponding to information about an SCS in which an OFDM symbol occupied by the DCI is located.

Optionally, the resource configuration information includes resource offset information, and the resource offset information includes resource offset information corresponding to the slot type information of the terminal device, and the determining module is configured to determine the uplink control channel resource based on the resource offset information.

Optionally, the resource configuration information includes resource offset information, and the resource offset information includes resource offset information corresponding to the time domain information and/or frequency domain information of the resource in which the downlink shared channel data packet of the terminal device is located, and the determining module is configured to determine the uplink control channel resource based on the resource offset information.

Optionally, the determining module is configured to obtain the resource offset based on the resource offset information, and determine the uplink control channel resource based on an index value of a resource unit carrying the DCI.

Optionally, the determining module is configured to obtain the resource offset based on the resource offset information, and determine the uplink control channel resource based on a frequency domain resource index that is indicated by a access network device and that is of an uplink control channel used for transmitting UCI.

Optionally, the resource configuration information further includes frequency domain resource index information, where the frequency domain resource index information includes frequency domain resource index information corresponding to the slot type information of the terminal device, or frequency domain resource index information corresponding to the time domain information and/or frequency domain information of the resource in which the downlink shared channel data packet of the terminal device is located, or frequency domain resource index information corresponding to the subband information of the terminal device, and the determining module is configured to determine the uplink control channel resource based on the frequency domain resource index information and an offset related to an uplink control channel type.

Optionally, the resource unit index value includes a resource unit index value of first DCI, or a resource unit index value of second DCI, where the DCI of the terminal device is carried by the first DCI and/or the second DCI.

Optionally, the resource unit index value includes a resource unit index value of a physical downlink shared channel PDSCH carrying the DCI of the terminal device, or a resource unit index value of a short PDSCH carrying the DCI, where the resource unit index value includes a system-level resource unit index value, or a subband-level resource unit index value.

Optionally, the resource unit index value is determined based on a resource unit index value of first DCI and a resource unit index value of second DCI, where the DCI of the terminal device is carried by the first DCI and/or the second DCI.

Optionally, the subband information of the terminal device includes information about at least one subband of an uplink UL frequency domain of the terminal device, and information about at least one subband of a downlink DL frequency domain of the terminal device, and the obtaining module is further configured to obtain a mapping relationship between the subband of the UL frequency domain corresponding to the subband information and the subband of the DL frequency domain corresponding to the subband information, and determine an operating UL subband of the terminal device based on the mapping relationship obtained by the obtaining module.

Optionally, the obtaining module is configured to determine a subband resource offset of the operating UL subband of the terminal device based on the mapping relationship, so as to determine the uplink control channel resource based on the resource configuration information and the subband resource offset, where the subband resource offset is used to determine an offset of a resource block RB used in the subband of the UL frequency domain.

Optionally, the obtaining module is configured to if at least two subbands of the DL frequency domain are mapped to a same subband of the UL frequency domain, obtain a subband resource offset associated with a subband of the DL frequency domain.

Optionally, the subband information of the terminal device includes information about at least one subband of a UL frequency domain of the terminal device, and the obtaining module is further configured to obtain preconfigured subband configuration information or subband configuration information sent by an access network device, and determine an operating UL subband of the terminal device based on the subband configuration information, and the determining module is configured to determine, based on a predefined uplink control channel resource calculation manner and the resource configuration information, an uplink control channel resource corresponding to the operating UL subband of the terminal device.

Optionally, the subband information of the terminal device includes information about at least one subband of a DL frequency domain of the terminal device, and the determining module is configured to determine a subband resource offset based on an operating DL subband of the terminal device, where the subband resource offset is used to determine a UL frequency domain resource corresponding to the operating DL subband of the terminal device, and determine, based on the resource configuration information and the subband resource offset, an uplink control channel resource corresponding to the operating DL subband of the terminal device.

Optionally, each subband included in the DL frequency domain of the terminal device corresponds to a subband resource offset, and the determining module is configured to obtain a subband resource offset corresponding to the operating DL subband of the terminal device as the subband resource offset.

Optionally, each subband included in the DL frequency domain of the terminal device corresponds to a subband resource offset, and the determining module is configured to obtain subband resource offsets of the operating DL subband of the terminal device and each subband before the operating DL subband of the terminal device in the DL frequency domain, and determine a cumulative value of the obtained subband resource offsets as the subband resource offset.

Optionally, the subband of the DL frequency domain and/or the subband of the UL frequency domain are/is obtained through allocation based on content of the UCI of the terminal device and/or a slot type of the terminal device.

Optionally, the resource configuration information further includes code division multiplexing information, where the code division multiplexing information includes a code division multiplexing resource corresponding to information about an orthogonal frequency division multiplexing (OFDM) symbol occupied by the DCI, or a code division multiplexing resource corresponding to a slot type of the terminal device, and the code division multiplexing resource includes one or a combination of the following: information about a reference signal sequence carrying the UCI, cyclic offset information of the reference signal sequence, and information about an orthogonal sequence used in time domain and/or frequency domain, and the determining module is configured to determine, based on the code division multiplexing information, a manner of sending the uplink control channel resource.

According to a sixth aspect, a terminal device is provided. The terminal device may include an obtaining module, configured to obtain resource configuration information of an uplink control channel, and a determining module, configured to determine, based on the resource configuration information obtained by the obtaining module, information about a time domain location in a slot or a subframe in which the uplink control channel is located.

Optionally, the resource configuration information includes indication information for searching for a PUCCH, and the determining module is configured to search, based on the indication information, for an uplink control channel that is closest to a current moment and after the current moment and that satisfies a channel requirement, and determine a time domain location in a slot or a subframe in which the uplink control channel is located, where the current moment is a moment when the terminal device receives DCI delivered by an access network device, or a moment when the terminal device parses out a downlink shared channel data packet.

Optionally, the resource configuration information includes a channel type of the uplink control channel, and the channel type of the uplink control channel includes a short uplink control channel and/or a long uplink control channel, and the determining module is configured to search for an uplink control channel that is closest to a current moment and after the current moment and that satisfies a requirement of the channel type, and determine a time domain location in a slot or a subframe in which a found short uplink control channel and/or a found long uplink control channel are/is located, where the current moment is a moment when the terminal device receives DCI delivered by an access network device, or a moment when the terminal device parses out a downlink shared channel data packet.

Optionally, the resource configuration information includes bit information of the uplink control channel, the bit information is used to indicate that an uplink control channel used for transmitting UCI is a $k^{th}$ uplink control channel, the $k^{th}$ uplink control channel includes a short uplink control channel and/or a long uplink control channel, and k is an integer greater than or equal to 1, and the determining module is configured to search for a $k^{th}$ short uplink control channel and/or a $k^{th}$ long uplink control channel after or starting from a current moment, and determine a time domain location in a slot or a subframe in which a found short uplink control channel and/or a found long uplink control channel are/is located, where the current moment is a moment when the terminal device receives DCI delivered by an access network device, or a moment when the terminal device parses out a downlink shared channel data packet.

Optionally, the resource configuration information includes timing information of the following: a time domain location at which a first hybrid automatic repeat request (HARQ) process receives a downlink shared channel data packet, and a time domain location of an uplink control channel at which UCI of the downlink shared channel data packet is fed back, and the determining module is configured to determine, based on the timing information and a first time domain location at which the first HARQ process receives a first downlink shared channel data packet, a time domain location of an uplink control channel at which UCI of the first downlink shared channel data packet is fed back, and determine a difference between the first time domain location and a second time domain location at which a second HARQ process receives a second downlink shared channel data packet, and determine, based on the difference and the time domain location of the uplink control channel at which the UCI of the first downlink shared channel data packet is fed back, a time domain location of an uplink control channel at which UCI of the second downlink shared channel data packet is to be fed back, as the information about the time domain location in the slot or the subframe in which the uplink control channel is located.

Optionally, the resource configuration information includes a reference timing relationship between a time domain location at which a downlink shared channel data packet is received and a time domain location of an uplink control channel at which UCI of the downlink shared channel data packet is fed back, where the reference timing relationship is used to indicate a time domain location of an uplink control channel at which UCI of a downlink shared channel data packet is fed back and that is corresponding to a time domain location at which a HARQ process receives the downlink shared channel data packet, and the determining module is configured to determine a time domain location at which a downlink shared channel data packet is received, and determine, based on the reference timing relationship and the time domain location, a time domain location of an uplink control channel at which UCI of the downlink shared channel data packet is to be fed back, as the information about the time domain location in the slot or the subframe in which the uplink control channel is located.

Optionally, the resource configuration information includes a reference timing relationship between a time domain location at which a downlink shared channel data packet is received and a time domain location of an uplink control channel at which UCI of the downlink shared channel data packet is fed back, and a preconfigured time domain location offset or a time domain location offset sent by an access network device, where the reference timing relationship is used to indicate a time domain location of an uplink control channel at which UCI of a downlink shared channel data packet is fed back and that is corresponding to a time domain location at which a HARQ process receives the downlink shared channel data packet, and the determining module is configured to determine a time domain location at which a downlink shared channel data packet is received, and determine, based on the reference timing relationship and the time domain location offset, a second time domain location of an uplink control channel at which UCI of the downlink shared channel data packet is to be fed back and that is corresponding to a first time domain location at which the downlink shared channel data packet is received, as the information about the time domain location in the slot or the subframe in which the uplink control channel is located.

Optionally, the reference timing relationship is a time domain location relationship between a time domain location at which a specified HARQ process receives a downlink shared channel data packet and a time domain location of an uplink control channel at which UCI of the downlink shared channel data packet is fed back, where the specified HARQ process is a preconfigured HARQ process, or a HARQ process that is indicated by a HARQ identity ID sent by an access network device.

Optionally, the resource configuration information further includes information about a hybrid automatic repeat request (HARQ) ID associated with time domain information of the uplink control channel for transmitting the UCI, and the determining module is configured to determine time domain location information of an uplink control channel of a HARQ process indicated by the HARQ ID, as the information about the time domain location in the slot or the subframe in which the uplink control channel is located.

Optionally, the resource configuration information further includes bit indication information of the time domain location in the slot or the subframe in which the uplink control channel is located, and the determining module is configured to search, based on the bit indication information, a preconfigured uplink control channel location set for the time domain location, indicated by the bit indication information, in the slot or the subframe in which the uplink control channel is located.

Optionally, the uplink control channel location set includes a time domain location and/or a frequency domain location of at least one uplink control channel of at least one slot, where a time domain location or a frequency domain location of each uplink control channel is represented by a PUCCH location element in the uplink control channel location set.

Optionally, the uplink control channel location set includes at least one uplink control channel location element, where each uplink control channel location element represents a time domain location and/or a frequency domain location of one uplink control channel, and a time domain location of the uplink control channel includes a time domain location of a short uplink control channel or a time domain location of a long uplink control channel.

According to a seventh aspect, a terminal device is provided. The terminal device may include an obtaining module, configured to obtain resource configuration information of an uplink control channel, where the resource configuration information includes information about a resource occupied by the uplink control channel on an uplink shared channel resource, and the resource information is used to instruct the terminal device to send uplink control information UCI on a specified quantity of orthogonal frequency division multiplexing (OFDM) symbols at one end or at two ends of a frequency domain of the uplink shared channel resource, or used to instruct the terminal device to send UCI on all OFDM symbols at one end or at two ends of a frequency domain of the uplink shared channel resource, and a determining module, configured to determine, based on the resource configuration information obtained by the obtaining module, information about a time domain location in a slot or a subframe in which the uplink control channel is located.

According to an eighth aspect, an access network device is provided. The access network device may include a determining module, configured to determine resource configuration information based on first information, and a sending module, configured to send the resource configuration information determined by the determining module to a terminal device, where the resource configuration information is used to instruct the terminal device to determine an uplink control channel resource based on the resource configuration information, and send uplink control information on the uplink control channel resource.

The resource configuration information includes a parameter corresponding to the first information, the first information includes at least one of subband information of the terminal device and second information, and the second information includes at least one of the following information time domain information and/or frequency domain information of a resource in which downlink control information (DCI) of the terminal device is located, slot type information of the terminal device, and time domain information and/or frequency domain information of a resource in which a downlink shared channel data packet of the terminal device is located.

Optionally, the resource configuration information includes resource offset information, and the resource offset information includes resource offset information corresponding to the time domain information and/or frequency domain information of the resource in which the DCI of the terminal device is located.

Optionally, the resource offset information corresponding to the time domain information and/or frequency domain information of the resource in which the DCI of the terminal device is located includes first resource offset information corresponding to information about an orthogonal frequency division multiplexing (OFDM) symbol occupied by the DCI, or second resource offset information corresponding to information about a subcarrier spacing (SCS) occupied by the DCI, or third resource offset information corresponding to information about an SCS in which an OFDM symbol occupied by the DCI is located.

Optionally, the resource configuration information includes resource offset information, and the resource offset information includes resource offset information corresponding to the slot type information of the terminal device.

Optionally, the resource configuration information includes resource offset information, and the resource offset information includes resource offset information corresponding to the time domain information and/or frequency domain information of the resource in which the downlink shared channel data packet of the terminal device is located.

Optionally, the sending module is further configured to send, to the terminal device, a resource unit index value of a time domain resource of an uplink control channel used for transmitting UCI.

Optionally, the resource unit index value includes a resource unit index value of first DCI, or a resource unit index value of second DCI, where the DCI of the terminal device is carried by the first DCI and/or the second DCI.

Optionally, the resource unit index value includes a resource unit index value of a physical downlink shared channel PDSCH carrying the DCI of the terminal device, or a resource unit index value of a short PDSCH carrying the DCI, where the resource unit index value includes a system-level resource unit index value, or a subband-level resource unit index value.

Optionally, the resource unit index value is determined based on a resource unit index value of first DCI and a resource unit index value of second DCI, where the DCI of the terminal device is carried by the first DCI and/or the second DCI.

Optionally, the sending module is further configured to send, to the terminal device, a resource unit index value of a frequency domain resource of an uplink control channel used for transmitting UCI.

Optionally, the frequency domain resource index information includes frequency domain resource index information corresponding to the slot type information of the terminal device, or frequency domain resource index information corresponding to the time domain information and/or frequency domain information of the resource in which the downlink shared channel data packet of the terminal device is located, or frequency domain resource index information corresponding to the subband information of the terminal device.

Optionally, the sending module is further configured to send downlink control information to the terminal device, so that the terminal device obtains a resource unit index value of a time domain resource of the downlink control information.

Optionally, the resource unit index value includes a resource unit index value of first DCI, or a resource unit index value of second DCI, where the DCI of the terminal device is carried by the first DCI and/or the second DCI.

Optionally, the resource unit index value includes a resource unit index value of a physical downlink shared channel PDSCH carrying the DCI of the terminal device, or a resource unit index value of a short PDSCH carrying the DCI, where the resource unit index value includes a system-level resource unit index value, or a subband-level resource unit index value.

Optionally, the resource unit index value is determined based on a resource unit index value of first DCI and a resource unit index value of second DCI, where the DCI of the terminal device is carried by the first DCI and/or the second DCI.

Optionally, the sending module is further configured to send, to the terminal device, a resource unit index value of a frequency domain resource of an uplink control channel used for transmitting UCI.

Optionally, the frequency domain resource index information includes frequency domain resource index information corresponding to the slot type information of the terminal device, or frequency domain resource index information corresponding to the time domain information and/or frequency domain information of the resource in which the downlink shared channel data packet of the terminal device is located, or frequency domain resource index information corresponding to the subband information of the terminal device.

Optionally, the subband information of the terminal device includes information about at least one subband of an uplink UL frequency domain of the terminal device, and information about at least one subband of a downlink DL frequency domain of the terminal device, and the sending module is further configured to send, to the terminal device, a mapping relationship between the subband of the UL frequency domain corresponding to the subband information and the subband of the DL frequency domain corresponding to the subband information, to instruct the terminal device to determine, based on the mapping relationship, an operating UL subband of the terminal device.

Optionally, the sending module is further configured to send a subband resource offset of an operating UL subband of the terminal device to the terminal device, to instruct the terminal device to determine, based on the resource configuration information and the subband resource offset, the uplink control channel resource, where the subband resource offset is used to determine an offset of a resource block RB used in the subband of the UL frequency domain.

Optionally, the subband information of the terminal device includes information about at least one subband of a UL frequency domain of the terminal device, and the sending module is further configured to send subband configuration information to the terminal device, to instruct the terminal device to determine an operating UL subband of the terminal device based on the subband configuration information, and determine, based on a predefined uplink control channel resource calculation manner and the resource configuration information, an uplink control channel resource corresponding to the operating UL subband of the terminal device.

Optionally, the subband information of the terminal device includes information about at least one subband of a DL frequency domain of the terminal device, and the sending module is further configured to send a subband resource offset of an operating DL subband of the terminal device to the terminal device, where the subband resource offset is used to determine a UL frequency domain resource corresponding to the operating DL subband of the terminal device.

Optionally, each subband included in the DL frequency domain of the terminal device corresponds to a subband resource offset, and the sending module is further configured to obtain, from the terminal device, a subband resource offset corresponding to the operating DL subband of the terminal device as the subband resource offset, or send, to the terminal device, subband resource offsets of the operating DL subband of the terminal device and each subband before the operating DL subband of the terminal device in the DL frequency domain, so that the terminal device determines a cumulative value of the obtained subband resource offsets as the subband resource offset.

Optionally, the subband of the DL frequency domain and/or the subband of the UL frequency domain are/is obtained through allocation based on content of the UCI of the terminal device and/or a slot type of the terminal device.

Optionally, the resource configuration information further includes code division multiplexing information, where the code division multiplexing information includes a code division multiplexing resource corresponding to information about an orthogonal frequency division multiplexing (OFDM) symbol occupied by the DCI, or a code division multiplexing resource corresponding to a slot type of the terminal device, and the code division multiplexing resource includes one or a combination of the following: information about a reference signal sequence carrying the UCI, cyclic offset information of the reference signal sequence, and information about an orthogonal sequence used in time domain and/or frequency domain.

This application further provides an access network device. The access network device may include a determining module, configured to determine resource configuration information of an uplink control channel, and a sending module, configured to send the resource configuration information to a terminal device, where the resource configuration information is used to indicate information about a time domain location in a slot or a subframe in which the uplink control channel is located.

Optionally, the resource configuration information includes indication information for searching for a PUCCH, and the indication information is used to instruct the terminal device to search for an uplink control channel that is closest to a current moment and after the current moment and that satisfies a channel requirement, and determine a time domain location in a slot or a subframe in which the uplink control channel is located, where the current moment is a moment when the terminal device receives DCI delivered by the access network device, or a moment when the terminal device parses out a downlink shared channel data packet.

Optionally, the resource configuration information includes a channel type of the uplink control channel, and the channel type of the uplink control channel includes a short uplink control channel and/or a long uplink control channel, and the resource configuration information is used to instruct the terminal device to search for an uplink control channel that is closest to a current moment and after the current moment and that satisfies a requirement of the channel type, and determine a time domain location in a slot or a subframe in which a found short uplink control channel and/or a found long uplink control channel are/is located, where the current moment is a moment when the terminal device receives DCI delivered by the access network device, or a moment when the terminal device parses out a downlink shared channel data packet.

Optionally, the resource configuration information includes bit information of the uplink control channel, the bit information is used to indicate that an uplink control channel used for transmitting UCI is a $k^{th}$ uplink control channel, the $k^{th}$ uplink control channel includes a short uplink control channel and/or a long uplink control channel, and k is an integer greater than or equal to 1, and the resource configuration information is used to instruct the terminal device to search for a $k^{th}$ short uplink control channel and/or a $k^{th}$ long uplink control channel after or starting from a current moment, and determine a time domain location in a slot or a subframe in which a found short uplink control channel and/or a found long uplink control channel are/is located, where the current moment is a moment when the terminal device receives DCI delivered by the access network device, or a moment when the terminal device parses out a downlink shared channel data packet. Optionally, the resource configuration information includes timing information of the following: a time domain location at which a first hybrid automatic repeat request (HARQ) process receives a downlink shared channel data packet, and a time domain location of an uplink control channel at which UCI of the downlink shared channel data packet is fed back.

Optionally, the resource configuration information includes a reference timing relationship between a time domain location at which a downlink shared channel data packet is received and a time domain location of an uplink control channel at which UCI of the downlink shared channel data packet is fed back, where the reference timing relationship is used to indicate a time domain location of an uplink control channel at which UCI of a downlink shared channel data packet is fed back and that is corresponding to a time domain location at which a HARQ process receives the downlink shared channel data packet.

Optionally, the resource configuration information includes a reference timing relationship between a time domain location at which a downlink shared channel data packet is received and a time domain location of an uplink control channel at which UCI of the downlink shared channel data packet is fed back, where the reference timing relationship is used to indicate a time domain location of an uplink control channel at which UCI of a downlink shared channel data packet is fed back and that is corresponding to a time domain location at which a HARQ process receives the downlink shared channel data packet, and the sending module is further configured to send a time domain location offset to the terminal device, where the time domain location offset is used to instruct the terminal device to determine, based on the reference timing relationship and the time domain location offset, a time domain location of an uplink control channel at which UCI of a downlink shared channel data packet is to be fed back and that is corresponding to a time domain location at which the downlink shared channel data packet is received, as the information about the time domain location in the slot or the subframe in which the uplink control channel is located.

Optionally, the reference timing relationship is a time domain location relationship between a time domain location at which a specified HARQ process receives a downlink shared channel data packet and a time domain location of an uplink control channel at which UCI of the downlink shared channel data packet is fed back, where the specified HARQ process is a preconfigured HARQ process, or a HARQ process that is indicated by a HARQ identity ID sent by an access network device.

Optionally, the resource configuration information further includes information about a hybrid automatic repeat request (HARQ) ID associated with time domain information of the uplink control channel for transmitting the UCI, and the HARQ ID information is used to instruct the terminal device to determine time domain location information of an uplink control channel of a HARQ process indicated by the HARQ ID, as the information about the time domain location in the slot or the subframe in which the uplink control channel is located.

Optionally, the resource configuration information further includes bit indication information of the time domain location in the slot or the subframe in which the uplink control channel is located, and the bit indication information is used to instruct the terminal device to search a preconfigured uplink control channel location set for the time domain location, indicated by the bit indication information, in the slot or the subframe in which the uplink control channel is located.

Optionally, the uplink control channel location set includes a time domain location and/or a frequency domain location of at least one uplink control channel of at least one slot, where a time domain location or a frequency domain location of each uplink control channel is represented by an uplink control channel location element in the uplink control channel location set.

Optionally, the uplink control channel location set includes at least one uplink control channel location element, where each uplink control channel location element represents a time domain location and/or a frequency domain location of one uplink control channel, and a time domain location of the uplink control channel includes a time domain location of a short uplink control channel or a time domain location of a long uplink control channel.

Optionally, the resource configuration information includes information about a resource occupied by the uplink control channel on an uplink shared channel resource, and the resource information is used to instruct the terminal device to send uplink control information (UCI) on a specified quantity of orthogonal frequency division multiplexing (OFDM) symbols at one end or at two ends of a frequency domain of the uplink shared channel resource, or used to instruct the terminal device to send UCI on all OFDM symbols at one end or at two ends of a frequency domain of the uplink shared channel resource.

According to a ninth aspect, an uplink control channel resource mapping system is provided. The system may include the terminal device according to any one of the fifth aspect, the sixth aspect, or the seventh aspect, and the access network device according to the eighth aspect.

According to a tenth aspect, a terminal device is provided. The terminal device may include a memory, a transceiver, and a processor, where the memory is configured to store a set of program code, and the transceiver and the processor are configured to invoke the program code stored in the memory, to perform the method provided in the first aspect.

According to an eleventh aspect, a terminal device is provided. The terminal device may include a memory, a transceiver, and a processor, where the memory is configured to store a set of program code, and the transceiver and the processor are configured to invoke the program code stored in the memory, to perform the method provided in the second aspect.

According to a twelfth aspect, a terminal device is provided. The terminal device may include a memory, a transceiver, and a processor, where the memory is configured to store a set of program code, and the transceiver and the processor are configured to invoke the program code stored in the memory, to perform the method provided in the third aspect.

According to a thirteenth aspect, a terminal device is provided. The terminal device may include a memory, a transceiver, and a processor, where the memory is configured to store a set of program code, and the transceiver and the processor are configured to invoke the program code stored in the memory, to perform the method provided in the fourth aspect.

In this application, the terminal device may determine the uplink control channel resource based on the preconfigured resource configuration information or the resource configuration information sent by the access network device. This can improve association between the uplink control channel resource used for transmitting the UCI and the resource configuration information and reduce a probability of a collision in occupancy of the uplink control channel resource, thereby improving accuracy of UCI transmission and reducing signaling overheads in data transmission, with higher applicability. Furthermore, in this application, specific offsets of a frequency domain resource and a time domain resource may be determined by configuration information, or the uplink shared channel resource is offset based on the uplink control channel resource, and specific offsets of a frequency domain resource and a time domain resource may be determined by configuration information. In this way, an implementation is more flexible, so that a corresponding sending resource can be flexibly selected for the uplink control channel and the uplink shared channel based on an uplink data sending bandwidth capability of the terminal device and an interference status of the uplink control channel and the uplink shared channel during practical use, with higher applicability.

In this application, the resource configuration information of the uplink control channel may be delivered to the terminal device in a plurality of manners, and the terminal device may determine, based on the information carried in the resource configuration information, the time domain location and/or the frequency domain location of the uplink control channel for sending the UCI. In this way, an operation is more flexible, and applicability is higher.

BRIEF DESCRIPTION OF THE DRAWINGS

To describe the technical solutions in the embodiments of the present disclosure more clearly, the following describes the accompanying drawings required for the embodiments of the present disclosure.

DETAILED DESCRIPTION OF ILLUSTRATIVE EMBODIMENTS

The following describes the embodiments of the present disclosure with reference to the accompanying drawings in the embodiments of the present disclosure.

In the embodiments of this application, an access network device may be any device having a wireless sending/receiving function, including but not limited to a NodeB, an evolved NodeB (eNB), a base station in a 5G communications system, a base station or a network device in a future communications system, an access node in a Wi-Fi system, a wireless relay node, a wireless backhaul node, and the like. In the following embodiments, an eNB is used as an example for description. In the embodiments of this application, a terminal device may also be referred to as UE, a terminal, a mobile station (MS), a mobile terminal (MT), or the like. In the following embodiments, UE is used as an example for description. The UE may be a mobile phone, a tablet computer (Pad), a computer having a wireless sending/receiving function, a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, a relay device, or the like. An application scenario is not limited in the embodiments of this application.

Figure 1:
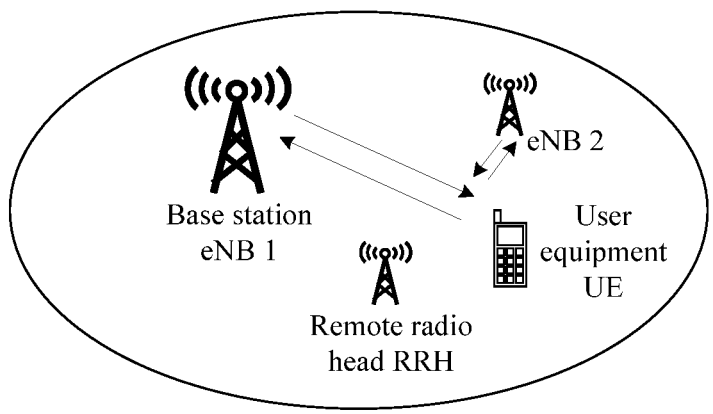
FIG. 1 is a schematic architectural diagram of a 5G communications system to which an embodiment of this application is applied.

FIG. 1 is a schematic architectural diagram of a 5G communications system to which an embodiment of this application is applied. As shown in FIG. 1, the communications system includes a remote radio head (remote radio head, RRH), an eNB 1, an eNB 2, UE, and the like. The RRH is a device using a new technology in a base station of a mobile broadband network, and a major benefit is improvement of existing signal transmission efficiency and expansion of network coverage with a network architecture that can be more easily constructed. The eNB 1 and the eNB 2 each may establish a connection to the UE in a wireless connection manner, a wired connection manner, or another connection manner. In this embodiment of this application, either of the eNB 1 and the eNB 2 is used as an example for description, collectively referred to as an eNB in the following description. The UE may be stationary, or may be moving, and this may be specifically determined based on an actual application scenario. FIG. 1 is merely a schematic diagram. The communications system may further include another network device and/or another terminal device not shown in FIG. 1, and this is not limited herein.

This embodiment of this application is applicable to downlink data transmission, or uplink data transmission, or device-to-device (D2D) data transmission. For downlink data transmission, a data sending device is a base station, and a corresponding data receiving device is UE. For uplink data transmission, a data sending device is UE, and a corresponding data receiving device is a base station. For D2D data transmission, a data sending device is UE, and a corresponding data receiving device is another UE. This may be specifically determined based on an actual application scenario, and is not limited in this embodiment of this application.

In the 5G communications system, when an eNB sends information to UE, a subcarrier spacing occupied in frequency domain may include 15 kHz, or 30 kHz, or 240 kHz, or the like. Subcarrier spacings with different frequency band lengths correspond to different resource lengths in time domain. To be specific, duration occupied by an OFDM symbol used by the eNB to send information to the UE in time domain is in a reverse-multiple relationship with a subcarrier spacing occupied by the OFDM symbol in frequency domain. For example, assuming that a subcarrier spacing occupied by OFDM symbols (for example, seven OFDM symbols) used by an eNB to send information to UE 1 in frequency domain is 15 kHz, duration occupied by the seven OFDM symbols in time domain is 0.5 ms. If a subcarrier spacing occupied by OFDM symbols (for example, seven OFDM symbols) used by the eNB to send information to UE 2 in frequency domain is 30 kHz, duration occupied by the seven OFDM symbols in time domain is 0.25 ms.

Figure 2:
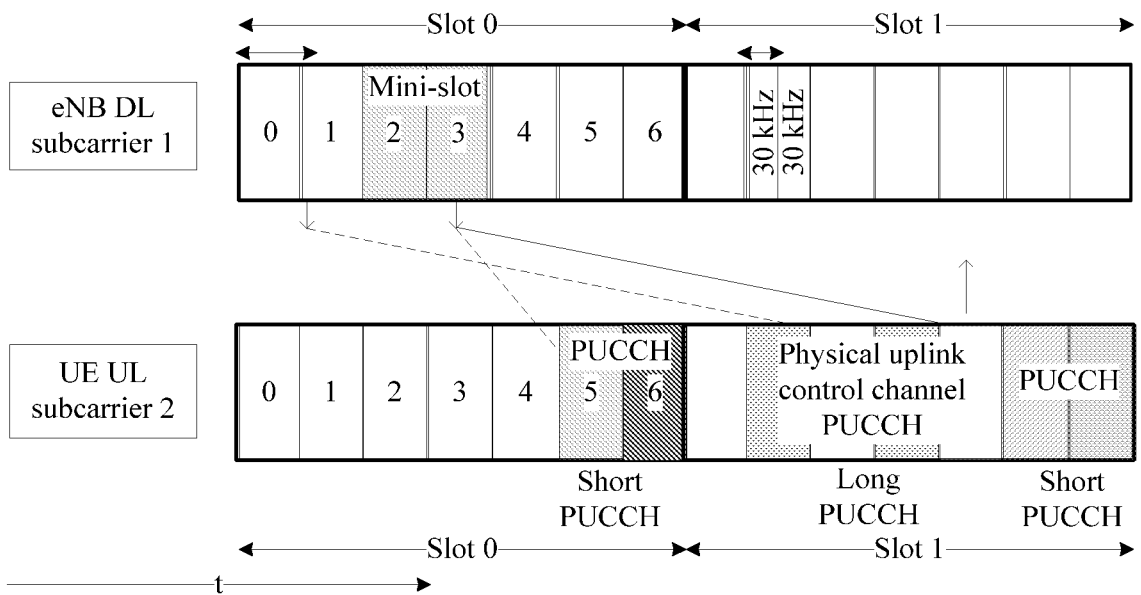
FIG. 2 is a schematic diagram of a frame structure in an FDD mode according to an embodiment of the present disclosure.

For a 15 kHz subcarrier spacing, one slot includes seven OFDM symbols, and duration is 0.5 ms. In the 5G communications system, working modes of the eNB and the UE are classified into two modes: time division duplex (TDD) and frequency division duplex (FDD). In the FDD mode, the eNB and the UE work on different frequency bands during downlink transmission in which the eNB transmits data to the UE and during uplink transmission in which the UE transmits data to the eNB. FIG. 2 is a schematic diagram of a frame structure in an FDD mode according to an embodiment of the present disclosure. As shown in FIG. 2, in the FDD mode, an eNB works on a downlink (DL) subcarrier 1, and UE works on an uplink (UL) subcarrier 2. Using a 15 kHz subcarrier spacing as an example, each slot (for example, a slot o) of the subcarrier 1 includes seven OFDM symbols. The slot o further includes a mini-slot, where the mini-slot includes two OFDM symbols. For a data packet (for example, a data packet 1) delivered by the eNB to the UE in the mini-slot, the UE may feed back, on a short PUCCH in a slot o of the subcarrier 2, a status of reception of the data packet 1. For a data packet (for example, a data packet 2) delivered by the eNB to the UE at the end of a last symbol of the slot o, the UE may feed back, on a long PUCCH or a short PUCCH in a slot 1 of the subcarrier 2, UCI of the data packet 2.

Figure 3:
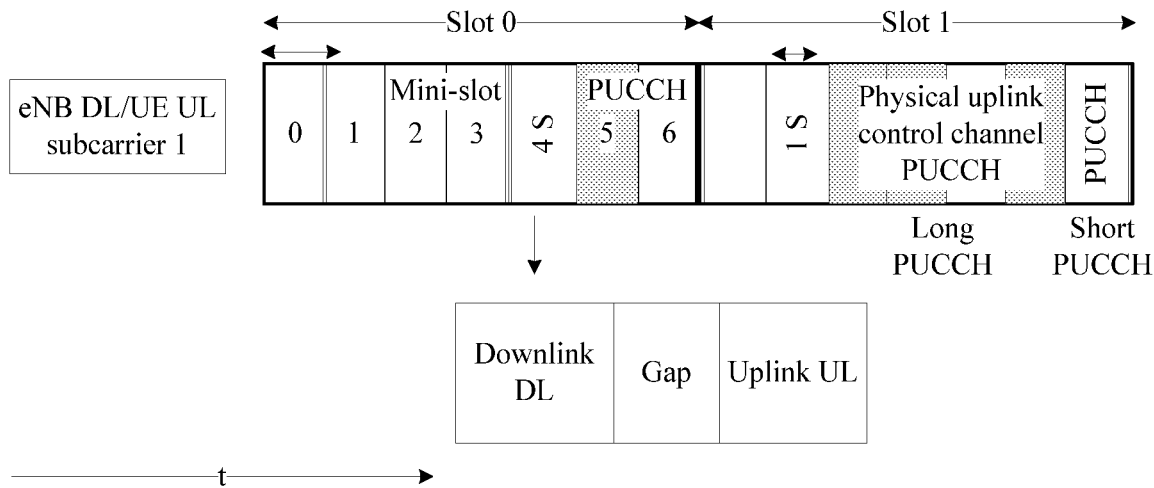
FIG. 3 is a schematic diagram of a frame structure in a TDD mode according to an embodiment of the present disclosure.

FIG. 3 is a schematic diagram of a frame structure in a TDD mode according to an embodiment of the present disclosure. As shown in FIG. 3, in the TDD mode, an eNB and UE share a same frequency band, except that they work on different OFDM symbols when the eNB transmits data to the UE and when the UE transmits data to the eNB. In a slot o of a subcarrier 1, there is another special OFDM symbol (for example, an OFDM symbol denoted as 4S, that is, a fifth OFDM symbol in seven OFDM symbols included in the slot o). A first portion of sampling points of the special OFDM symbol is used for DL data transmission, a second portion of the sampling points is a gap and unused, and a third portion of the sampling points is used for UL data transmission. In the 5G communications system, a quantity of OFDM symbols occupied by a short PUCCH in time domain is 1 or 2, and a quantity of OFDM symbols occupied by a long PUCCH in time domain is at least 4 and may be 14 at most. This may be specifically determined based on an actual application scenario, and is not limited herein.

In the 5G communications system, in the data transmission mode shown in FIG. 2 or FIG. 3, a slot o of a DL subcarrier further includes a mini-slot. Information delivered by an eNB to UE in the mini-slot may correspond to a piece of DCI, and data delivered in a last symbol of the slot o may correspond to another piece of DCI. In other words, in this working mode, when the eNB sends information to the UE, there is no longer only one piece of DCI within one slot, but there may be a plurality of pieces of DCI (for example, two pieces of DCI) within one slot (for example, a slot o), including DCI corresponding to the mini-slot. In this case, if a same CCE index is used for two pieces of DCI, consequently, a plurality of CCEs numbered with a same index use a resource at a same PUCCH frequency domain resource location. As a result, PUCCHs are not sufficient for use, and then an error occurs when the UE transmits UCI. In this case, an information transmission error rate is high, and applicability is low.

In addition, in the 5G communications system, UCI sent by UE to an eNB may include hybrid automatic repeat request (HARQ) feedback information, channel state information (CSI), scheduling request (SR) information, or the like. The HARQ feedback information may include a signal, such as a negative acknowledgement (NACK) or an acknowledgement (ACK). HARQ feedback has a slot-based timing relationship. For example, after obtaining a data packet from an eNB, UE may obtain, based on a slot in which the data packet is obtained and the timing relationship, a slot for performing HARQ feedback on a status of reception of the data packet, or after sending a data packet to an eNB, UE may determine, based on the timing relationship and a slot in which the data packet is sent, a slot for obtaining feedback information from the eNB. For a time domain resource occupied by a PUCCH, in the prior art, an eNB directly sends information about the time domain resource occupied by the PUCCH to UE, causing large signaling overheads. The signaling overheads increase as a quantity of UEs connected to the eNB increases, thereby increasing implementation costs.

The embodiments of the present disclosure provide an uplink control channel resource mapping method and apparatus, where UE may determine a PUCCH resource based on PUCCH resource configuration information sent by an eNB or preconfigured PUCCH resource configuration information, and send UCI on the PUCCH resource. During specific implementation, the determined PUCCH resource may be a time domain location and/or a frequency domain location of a PUCCH, where the time domain location may be specifically a slot for sending the UCI, and/or an OFDM symbol in a slot for sending the UCI, or the like. A specific representation form of the time domain location may be determined based on an actual application scenario, and is not limited herein. The resource configuration information is obtained from parameter settings that include time domain information and/or frequency domain information of a resource in which DCI of the UE is located, and/or obtained from parameter settings that include time domain information and/or frequency domain information of a resource in which a PDSCH data packet of the UE is located. The UE determines the PUCCH resource based on information about the parameter settings of the time domain information and/or frequency domain information of the resource in which the DCI or the PDSCH data packet is located. This can improve association between the PUCCH resource used for transmitting the UCI and the resource configuration information and reduce a probability of a collision in occupancy of the PUCCH resource, thereby improving accuracy of UCI transmission and reducing signaling overheads in data transmission, with higher applicability.

It should be noted that the UCI in this application includes at least one of the following information: HARQ feedback information (including a HARQ-ACK and/or a HARQ-NACK), channel state information reference signal (CSI-RS) information, buffer status report information, beam ID information, and scheduling request information. The CSI-RS information includes at least one of the following information: channel state indication information, channel quality indication information, precoding matrix indication information, rank indication information, channel state information resource indication information, and channel state information interference measurement information.

The HARQ feedback information in this application is feedback information based on one or more transport blocks, or feedback information based on one or more code blocks, or feedback information based on a combination of a transport block and a code block. The code block belongs to a transport block sent along with the code block, or a plurality of code blocks come from one transport block. Alternatively, the code block does not belong to a transport block sent along with the code block, or a plurality of code blocks come from different transport blocks.

Figure 4:
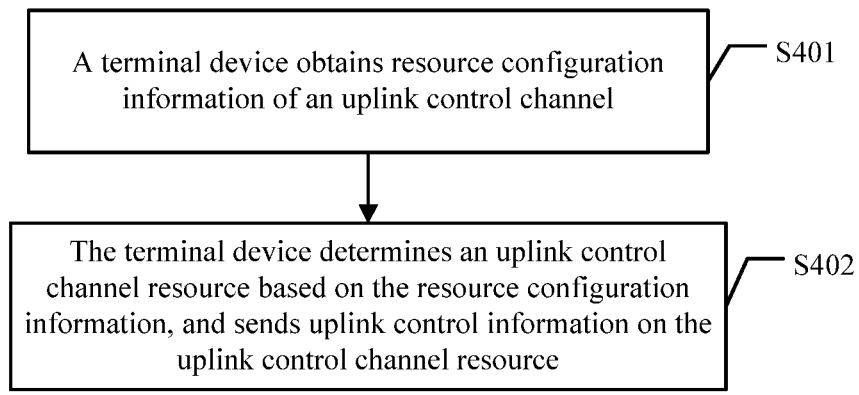
FIG. 4 is a schematic flowchart of an uplink control channel resource mapping method according to an embodiment of the present disclosure.

FIG. 4 is a schematic flowchart of an uplink control channel resource mapping method according to an embodiment of the present disclosure. The method provided in this embodiment of the present disclosure includes the following steps.

S401. UE obtains resource configuration information of an uplink control channel.

S402. The UE determines an uplink control channel resource based on the resource configuration information, and sends uplink control information on the uplink control channel resource.

In some feasible implementations, an eNB may allocate a PUCCH uplink resource to the UE based on a time-frequency resource occupied by DCI of the UE, so that UCI of different UEs can be placed in different locations, and then resource configuration information of a PUCCH can be sent to the UE, for the UE to search for a PUCCH resource used for transmitting UCI. The time-frequency resource occupied by the DCI of the UE may be specifically an OFDM symbol occupied by the DCI, or the like. In other words, the resource configuration information may be obtained from parameter settings that include time domain information and/or frequency domain information of a resource in which the DCI of the UE is located, or the resource configuration information may be obtained from parameter settings that include time domain information and/or frequency domain information of a resource in which a PDSCH data packet of the UE is located. Alternatively, the resource configuration information of the PUCCH may be obtained through pre-configuration in a stipulated manner, for example, through a communication protocol, and both the eNB and the UE may obtain the resource configuration information of the PUCCH in a stipulated manner, for example, through a communication protocol. This is not limited herein. The eNB may instruct, by using higher layer signaling, the UE to determine, based on the resource configuration information, the PUCCH resource for sending the UCI and the like. A specific instruction manner may be determined according to a requirement in an actual application scenario, and is not limited herein. In the following implementations, description is given by using an example in which the eNB delivers the resource configuration information to the UE. More specifically, the time domain information and/or frequency domain information of the resource in which the DCI is located is the time domain information of the resource in which the DCI is located, or the frequency domain information of the resource in which the DCI is located, or both the time domain information and the frequency domain information of the resource in which the DCI is located.

In some feasible implementations, for the resource configuration information in different representation forms, the UE may determine, in different manners, the PUCCH resource used for transmitting the UCI. The following separately describes manners in which the UE determines the PUCCH resource based on the resource configuration information in different representation forms.

Implementation 1

In some feasible implementations, the eNB may send resource configuration information to the UE, to instruct, by using the resource configuration information, the UE to send UCI on a corresponding PUCCH resource. After receiving the resource configuration information sent by the eNB, the UE may determine, based on the resource configuration information, a PUCCH resource used for transmitting the UCI. During specific implementation, the resource configuration information includes resource offset information corresponding to information about an OFDM symbol occupied by the DCI, or resource offset information corresponding to information about a subcarrier spacing (SCS) occupied by the DCI, or resource offset information corresponding to information about an SCS in which an OFDM symbol occupied by the DCI is located. The UE may determine, based on the resource offset information in any one of the foregoing representation forms, the PUCCH resource used for transmitting the UCI. During specific implementation, the resource offset information corresponding to the information about the OFDM symbol occupied by the DCI may be specifically resource offset information corresponding to each downlink OFDM symbol occupied by the DCI or a specified quantity of downlink OFDM symbols occupied by the DCI. For example, in a transmission mode shown in FIG. 2, the DCI of the UE occupies OFDM symbols included in a slot o of a subcarrier 1, and configuration may be performed in advance, so that first two OFDM symbols in the slot o correspond to one Nl (for example, an Nl 1), and two OFDM symbols included in a mini-slot of the slot o correspond to another Nl (for example, an Nl 2). Then the Nl 1 or the Nl 2 is a PUCCH resource offset corresponding to the downlink OFDM symbol. The Nl 1 or the Nl 2 is a PUCCH resource offset corresponding to two OFDM symbols. During specific implementation, alternatively, configuration may be performed so that each OFDM symbol corresponds to one PUCCH resource offset, that is, each OFDM symbol corresponds to one Nl.

Alternatively, the information about the OFDM symbol occupied by the DCI may be information about a type of a slot occupied by the DCI. During specific implementation, resource offset information corresponding to the information about the type of the slot occupied by the DCI may be specifically resource offset information corresponding to information about each type of slot occupied by the DCI. For example, in a transmission mode shown in FIG. 2, the DCI of the UE occupies a resource in a slot o of a subcarrier 1, and a data packet is sent by using the resource in the slot o, where the resource corresponds to one Nl (for example, an Nl 1), and two OFDM symbols included in a mini-slot of the slot o correspond to another Nl (for example, an Nl 2). Then the Nl 1 and the Nl 2 are PUCCH resource offsets corresponding to two types of slots occupied by the DCI. The Nl 1 and the Nl 2 are PUCCH resource offsets corresponding to two slot types. Optionally, the two slot types corresponding to the Nl 1 and the Nl 2 may be the same or different. Optionally, the two slot types corresponding to the Nl 1 and the Nl 2 occupy different time domain and/or frequency domain resources. Optionally, time domain resources, to which the two slot types corresponding to the Nl 1 and the Nl 2 may correspond, may be overlapping or non-overlapping. Optionally, the two slot types corresponding to the Nl 1 and the Nl 2 may occupy a same slot or different slots. The foregoing slot types and a case of a resource occupied by each slot type may be a combination of the foregoing optional solutions, and may be specifically determined according to a requirement in an actual application scenario. This is not limited herein.

During specific implementation, the resource configuration information includes resource offset information corresponding to slot type information of the terminal device, or the resource configuration information includes resource offset information corresponding to the time domain information and/or frequency domain information of the resource in which the downlink shared channel data packet of the terminal device is located. More specifically, the time domain information and/or frequency domain information of the resource in which the downlink shared channel data packet of the terminal device is located is the time domain information of the resource in which the downlink shared channel data packet of the terminal device is located, or the frequency domain information of the resource in which the downlink shared channel data packet of the terminal device is located, or both the time domain information and the frequency domain information of the resource in which the downlink shared channel data packet of the terminal device is located. The terminal device may determine, based on the resource offset information in any one of the foregoing representation forms, the PUCCH resource used for transmitting the UCI. The terminal device occupies a resource in a slot o of a subcarrier 1, and a data packet is sent by using the resource in the slot o, where the resource corresponds to one Nl (for example, an Nl 1), and two OFDM symbols included in a mini-slot of the slot o correspond to another Nl (for example, an Nl 2). Then the Nl 1 and the Nl 2 are PUCCH resource offsets corresponding to two slot types of the terminal device. The Nl 1 and the Nl 2 are PUCCH resource offsets corresponding to two slot types. Optionally, the two slot types corresponding to the Nl 1 and the Nl 2 may be the same or different. Optionally, the two slot types corresponding to the Nl 1 and the Nl 2 occupy different time domain and/or frequency domain resources. Optionally, time domain resources, to which the two slot types corresponding to the Nl 1 and the Nl 2 may correspond, may be overlapping or non-overlapping. Optionally, the two slot types corresponding to the Nl 1 and the Nl 2 may occupy a same slot or different slots. The foregoing slot types and a case of a resource occupied by each slot type may be a combination of the foregoing optional solutions, and may be specifically determined according to a requirement in an actual application scenario. This is not limited herein.

During specific implementation, the resource configuration information includes resource offset information corresponding to the time domain information and/or frequency domain information of the resource in which the downlink shared channel data packet of the terminal device is located. The terminal device may determine, based on the resource offset information in any one of the foregoing representation forms, the PUCCH resource used for transmitting the UCI. The terminal device occupies a time domain resource and/or a frequency domain resource of a downlink shared channel data packet in a slot o of a subcarrier 1, and a data packet is sent by using the resource in the slot o, where the resource corresponds to one Nl (for example, an Nl 1), and a mini-slot in the slot o includes another time domain resource and/or another frequency domain resource of a downlink shared channel data packet, that is, two OFDM symbols included in the mini-slot include a data packet that corresponds to another Nl (for example, an Nl 2). Then the Nl 1 and the Nl 2 are PUCCH resource offsets corresponding to two downlink data packets of the terminal device. The Nl 1 and the Nl 2 are PUCCH resource offsets corresponding to two downlink data packets. Optionally, types of the two data packets corresponding to the Nl 1 and the Nl 2 may be the same or different. Optionally, the two data packets corresponding to the Nl 1 and the Nl 2 occupy different time domain and/or frequency domain resources. Optionally, time domain resources, to which the two data packets corresponding to the Nl 1 and the Nl 2 may correspond, may be overlapping or non-overlapping. Optionally, the two data packets corresponding to the Nl 1 and the Nl 2 may occupy a same slot or different slots. The foregoing data packet types and a case of a resource occupied by each data packet may be a combination of the foregoing optional solutions, and may be specifically determined according to a requirement in an actual application scenario. This is not limited herein.

During specific implementation, the UE may obtain, based on the foregoing resource offset information, a resource offset used to determine the PUCCH resource, and determine the PUCCH resource based on an index value of a resource unit carrying the DCI of the UE. During specific implementation, if a data transmission mode used by the eNB is distributed transmission, the PUCCH resource may be determined based on an expression 1 or an expression 3 below, or if a data transmission mode used by the eNB is centralized transmission, the PUCCH resource may be determined based on an expression 2 or an expression 4 below.

$$n_{PUCCH}^{(k,p)} = n_{RU} + N_{PUCCH}^k + f(N_l) + c \quad (1)$$

$$n_{PUCCH}^{(k,p)} = \left\lfloor \frac{n_{RU,q}}{N_{RB}^{RU,q}} \right\rfloor N_{RB}^{RU,q} + N_{PUCCH}^k + f(N_l) + c \quad (2)$$

$$n_{PUCCH}^{(k,p)} = n_{RU,q} + N_{PUCCH}^k + + f(N_l) + c + \Delta_{offset} \quad (3)$$

$$n_{PUCCH}^{(k,p)} = \left\lfloor \frac{n_{RU,q}}{N_{RB}^{RU,q}} \right\rfloor N_{RB}^{RU,q} + N_{PUCCH}^k + f(N_l) + c + \Delta_{offset} \quad (4)$$

In the foregoing expressions 1, 2, 3, and 4, $n_{RU}$ represents a resource unit index value, or may represent an index value of a resource unit in a resource set q. During specific implementation, $n_{RU}$ may be specifically $n_{CCE}$, or may be a corresponding resource unit index value in another resource representation form. $n_{RU,q}$ represents an index value of a resource unit in a resource set q. The resource unit includes a limited quantity of resource elements (RE), or a limited quantity of resource element groups (REG), or a limited quantity of resource blocks (RB), or a limited quantity of CCEs. This may be specifically determined based on an actual application scenario. $n_{PUCCH}^{(k,\ p)}$ is resource unit index information of a PUCCH, where the resource unit index information of the PUCCH may be used to search for the corresponding PUCCH, k is a format type of the PUCCH, and p is a port number of an antenna and/or a value related to a beam number. $N_{PUCCH}^{k}$ is an offset related to user equipment, or may be an offset related to a resource set q of user equipment, and q is a resource set in which the DCI is located. $N_{RB}^{RU,q}$ represents a quantity of resource units included in a limited quantity of RBs in the resource set q. It should be noted that the format type of the PUCCH represented by k may be a format type related to different PUCCH lengths, or a format type related to all PUCCH lengths, or an identifier related to the resource set in which the DCI is located, and is not limited herein. A constant or variable c is related to an antenna port, and/or related to a beam. A value range of c may be an integer, or may be o, or may be 1, 2, or the like, for example, may be −1, −2, or the like. Herein, c may alternatively evolve into c1 and c2, where c1 and c2 are respectively related to an antenna port and a beam, and value ranges of c1 and c2 are the same as or similar to the value range of c. $\Delta_{offset}$ is a variable related to a data transmission mode (distributed transmission or centralized transmission) of the resource unit (RU). If control information corresponding to the RU is placed in a resource set, $\Delta_{offset}$ is an offset corresponding to the resource set, or is an offset related to a DCI control information format, and/or is an offset related to content of information carried by UCI of the PUCCH, or a finite combination of the foregoing offsets and/or offsets. A rounding-down operation in the formula (2) and the formula (4) is caused because centralized transmission is used for the resource set in which the DCI is located. If distributed transmission is used for the resource set in which the DCI is located, the formula (1) or (3) is selected.

The formula (1) is a formula most widely used. Herein, an application condition of the formula (1) may not be limited. Alternatively, the resource offset information corresponding to the information about the OFDM symbol occupied by the DCI, or the information about the OFDM symbol occupied by the DCI may be the resource offset information corresponding to the information about the type of the slot occupied by the DCI, and may be expressed by a function $f$. A representation form of the function $f$ may include any one of four forms shown by an expression 5, an expression 6, an expression 7, and an expression 8 below, or expressions of more representation forms obtained by extending the following four expressions. This is not limited herein.

$$f(N_l) = N_l \quad (5)$$

$$f(N_l) = N_{l-1} \quad (6)$$

$$f(N_l) = \sum_{i=1}^{i=l} N_i \quad (7)$$

$$f(N_l) = \sum_{i=1}^{i=l-1} N_i \quad (8)$$

The expression 5 indicates that a value of the function $f$ may be determined by $N_l$. The expression 6 indicates that a value of the function $f$ may be determined by $N_{l-1}$. The expression 7 indicates that a value of the function $f$ may be determined by a cumulative value of $N_l$ to $N_l$. The expression 8 indicates that a value of the function $f$ may be determined by a cumulative value of $N_l$ to $N_{l-1}$.

Further, the information about the OFDM symbol occupied by the DCI may be information about a specific OFDM symbol, information about specific consecutive OFDM symbols, information about a specific occupied downlink DCI set, or information about a specific downlink control channel of the UE. $N_l$ is resource offset information corresponding to: an $l^{th}$ OFDM symbol, or an $l^{th}$ consecutive OFDM symbol, or an $l^{th}$ occupied downlink DCI set, or an $l^{th}$ downlink control channel of the UE, or the like.

It should be noted that summation in the expression 1, the expression 2, the expression 3, and the expression 4 indicates a possible calculation manner, and specifically, may be separately expressed by each of the foregoing parameters, or determined in another calculation manner. This is not limited herein.

In some feasible implementations, a manner of obtaining the resource unit index value ($n_{RU}$) may include one or more manners, for example, implementations shown in the following case 1 to case 3. A specific obtaining manner may be determined based on an actual application scenario, and is not limited herein.

Case 1: The DCI of the UE may be carried by first DCI (for example, DCI 1) and/or second DCI (for example, DCI 2) together, where the DCI 1 corresponds to a resource unit index value (for example, an index 1), and the DCI 2 also corresponds to a resource unit index value (for example, an index 2). The UE may select either of the index 1 and the index 2 as the resource unit index value used to determine the PUCCH resource. For example, the index 1 or the index 2 may be an index of a resource unit, where the resource unit includes a limited quantity of REs, or a limited quantity of REGs, or a limited quantity of RBs, or a limited quantity of CCEs, or the like. The index 1 or the index 2 may be a parameter of a common search space or a non-common search space. For example, the DCI may be specific DCI of the UE, or may be DCI of a UE group, or may be specific DCI of a cell, or DCI of a common search space, or DCI of a non-common search space. This may be specifically determined based on an actual application scenario, and is not limited herein.

Case 2: The resource unit index value used by the UE to determine the PUCCH resource may be a resource unit index value of a PDSCH carrying the DCI, for example, an RE index, an REG index, an RB index, a CCE index, a quantity of REs, a quantity of REGs, a quantity of RBs, or a quantity of CCEs. This is not limited herein. Alternatively, the resource unit index value used by the UE to determine the PUCCH resource may be a resource location of a short PDSCH carrying the DCI, such as a resource unit index value of a short PDSCH carrying the DCI, for example, an RE index, an REG index, an RB index, a CCE index, a quantity of REs, a quantity of REGs, a quantity of RBs, or a quantity of CCEs. This is not limited herein. The resource location of the short PDSCH may be a resource index value of a PDSCH data packet, not related to the DCI. The resource unit index value includes a system-level resource unit index value, or a subband-level resource unit index value.

The short PDSCH and/or the PDSCH are/is a subband-level PDSCH, or one RB, or a set of RBs.

Case 3: The DCI of the UE may be carried by first DCI (for example, DCI 1) and second DCI (for example, DCI 2) together, where the DCI 1 corresponds to a resource unit index value (for example, an index 1), and the DCI 2 also corresponds to a resource unit index value (for example, an index 2). The UE may obtain, based on processing of a predefined function $f(\ )$ of the index 1 and the index 2, the resource unit index value used to determine the PUCCH resource. Simply, the UE may determine a sum of the index 1 and the index 2 as the resource unit index value used to determine the PUCCH resource, as shown by an expression 9 and an expression 10 below.

$$n_{RU,q}=f(n_{RU,q,DCI\ 1}, n_{RU,q,DCI\ 2})=n_{RU,q,DCI\ 1}+n_{RU,q,DCI\ 2} \quad (9)$$

$$n_{RU}=f(n_{RU,DCI\ 1}, n_{RU,DCI\ 2})=n_{RU,DCI\ 1}+n_{RU,DCI\ 2} \quad (10)$$

A meaning of $n_{RU}$ is consistent with the meaning of $n_{RU}$ included in the foregoing implementation. For details, refer to the meaning described in the foregoing implementation. Details are not described herein again. $n_{RU,q}$ represents an index value of a resource unit in a resource set q. $n_{RU,q,DCI\ 1}$ represents an index value of a resource unit, corresponding to the first DCI, in the resource set q. $n_{RU,q,DCI\ 2}$ represents an index value of a resource unit, corresponding to the second DCI, in the resource set q. $n_{RU,q,DCI\ 1}$ and $n_{RU,DCI\ 2}$ may correspond to a same resource set or different resource sets.

In some feasible implementations, the UE may alternatively obtain a resource offset based on the foregoing resource offset information, and determine the PUCCH resource based on a frequency domain resource index that is indicated by a base station and that is of a PUCCH used for transmitting UCI.

It should be noted that $n_{RU}$ described in this embodiment of the present disclosure is alternatively a frequency domain resource index that is indicated by a base station and that is of a PUCCH used for transmitting UCI. A meaning of $n_{RU}$ is consistent with the meaning of $n_{RU}$ included in the foregoing implementation. For details, refer to the meaning described in the foregoing implementation. Details are not described herein again.

It should be noted that the frequency domain resource index may be a resource index set configured by using higher layer signaling, and the eNB dynamically selects one element from the resource index set based on the DCI of the UE, and delivers the element to the UE. Alternatively, the frequency domain resource index is a frequency domain resource index delivered by the eNB to the UE by using higher layer signaling. Alternatively, the UE may obtain the frequency domain resource index in another manner of communication with the eNB. This may be specifically determined based on an actual application scenario, and is not limited herein.

Optionally, in some feasible implementations, a wider SCS may be used for a mini-slot, or in a plurality of different carriers, different SCSs are used for DCI, and corresponding UCI is fed back in a same PUCCH. For example, after a wider SCS is used for a mini-slot, a quantity of CCE indexes does not change within a same time period, but a problem of a PUCCH resource collision still exists. Therefore, SCS-based splitting needs to be performed for mapping the frequency domain resources, and an SCS-related frequency domain offset, for example, $\Delta_{SCS}$, needs to be added to a calculation formula for implicit mapping, and the UE may determine the PUCCH resource based on an expression 11 to an expression 14 below. A frequency domain offset related to the information about the SCS in which the OFDM symbol occupied by the DCI is located is, for example, $\Delta'_{SCS}$, and the UE may determine the PUCCH resource based on an expression 19 to an expression 22 below.

$$n_{PUCCH}^{(k,p)} = n_{RU} + N_{PUCCH}^{k} + f(\Delta_{SCS}) + c \quad (11)$$

$$n_{PUCCH}^{(k,p)} = \left\lfloor \frac{n_{RU,q}}{N_{RB}^{RU,q}} \right\rfloor N_{RB}^{RU,q} + N_{PUCCH}^{k} + f(\Delta_{SCS}) + c \quad (12)$$

$$n_{PUCCH}^{(k,p)} = n_{RU,q} + N_{PUCCH}^{k} + + f(\Delta_{SCS}) + c + \Delta_{offset} \quad (13)$$

$$n_{PUCCH}^{(k,p)} = \left\lfloor \frac{n_{RU,q}}{N_{RB}^{RU,q}} \right\rfloor N_{RB}^{RU,q} + N_{PUCCH}^{k} + f(\Delta_{SCS}) + c + \Delta_{offset} \quad (14)$$

For meanings of parameters in the expressions 11 to 14, refer to meanings of related parameters in the expressions 1 to 4. Details are not described herein again. Herein, a function $f$ is a function expression related to $\Delta_{SCS}$.

The foregoing offset is related to a function $f(\ )$, or the offset $\Delta_{SCS}$ is directly used. For example:

$$f(\Delta_{SCS})=\Delta_{SCS}$$

A representation form of the function $f$ may include any one of four forms shown by an expression 15, an expression 16, an expression 17, and an expression 18 below, or expressions of more representation forms obtained by extending the following four expressions. This is not limited herein.

Similar formulas are as follows:

$$f(\Delta_{scsl}) = \Delta_{scsl} \quad (15)$$

$$f(\Delta_{scsl}) = \Delta_{scsl-1} \quad (16)$$

$$f(\Delta_{scsl}) = \sum_{i=1}^{i=l} \Delta_{scsi} \quad (17)$$

$$f(\Delta_{scsl}) = \sum_{i=1}^{i=l-1} \Delta_{scsi} \quad (18)$$

The expression 15 indicates that a value of the function $f$ may be determined by $\Delta_{scsl}$. The expression 16 indicates that a value of the function $f$ may be determined by $\Delta_{scsl-1}$. The expression 17 indicates that a value of the function $f$ may be determined by a cumulative value of $\Delta_{scs1}$ to $\Delta_{scsl}$. The expression 18 indicates that a value of the function $f$ may be determined by a cumulative value of $\Delta_{scs1}$ to $\Delta_{scsl-1}$.

Further, the foregoing parameter l corresponds to a type of the SCS, or corresponds to OFDM information of the SCS, or corresponds to a slot type of the SCS, or corresponds to a time sequence relationship of the SCS. This may be specifically determined based on an actual application scenario, and is not limited herein.

Likewise, same description may be used for $\Delta'_{SCS}$.

$$n_{PUCCH}^{(k,p)} = n_{RU} + N_{PUCCH}^{k} + f(\Delta'_{SCS}) + c \quad (19)$$

$$n_{PUCCH}^{(k,p)} = \left\lfloor \frac{n_{RU,q}}{N_{RB}^{RU,q}} \right\rfloor N_{RB}^{RU,q} + N_{PUCCH}^{k} + f(\Delta'_{SCS}) + c \quad (20)$$

$$n_{PUCCH}^{(k,p)} = n_{RU,q} + N_{PUCCH}^{k} + + f(\Delta'_{SCS}) + c + \Delta_{offset} \quad (21)$$

-continued $$n_{PUCCH}^{(k,p)} = \left\lfloor \frac{n_{RU,q}}{N_{RB}^{RU,q}} \right\rfloor N_{RB}^{RU,q} + N_{PUCCH}^{k} + f(\Delta'_{SCS}) + c + \Delta_{offset} \quad (22)$$

For meanings of parameters in the expressions 19 to 22, refer to meanings of related parameters in the expressions 1 to 4. Details are not described herein again. Herein, a function $f$ is a function expression related to $\Delta'_{SCS}$.

A representation form of the function $f$ may include any one of four forms shown by an expression 23, an expression 24, an expression 25, and an expression 26 below, or expressions of more representation forms obtained by extending the following four expressions. This is not limited herein.

Similar formulas are as follows:

$$f(\Delta'_{scsl}) = \Delta'_{scsl} \quad (23)$$

$$f(\Delta'_{scsl}) = \Delta'_{scsl-1} \quad (24)$$

$$f(\Delta'_{scsl}) = \sum_{i=1}^{i=l} \Delta'_{scsi} \quad (25)$$

$$f(\Delta'_{scsl}) = \sum_{i=1}^{i=l-1} \Delta'_{scsi} \quad (26)$$

The expression 23 indicates that a value of the function $f$ may be determined by $\Delta'_{scsl}$. The expression 24 indicates that a value of the function $f$ may be determined by $\Delta'_{scsl-1}$. The expression 25 indicates that a value of the function $f$ may be determined by a cumulative value of $\Delta'_{scs1}$ to $\Delta'_{scsl}$. The expression 26 indicates that a value of the function $f$ may be determined by a cumulative value of $\Delta'_{scs1}$ to $\Delta'_{scsl-1}$.

Certainly, if a time-frequency resource block occupied by the DCI increases proportionally, correspondingly, all of the foregoing offsets increase proportionally. For example, if resource blocks occupied by a mini-slot of the DCI are half more than resource blocks occupied by a reference mini-slot, a corresponding offset is also half more.

During specific implementation, the foregoing offset may be configured through notification by using RRC signaling, or through notification by using DCI, or in a manner in which a set is notified by using RRC signaling, and then one element is selected from the set for the DCI, or in a manner of enabling the DCI. A specific configuration manner may be determined according to a requirement in an actual application scenario. Details are not described herein again.

It should be noted that, in a general case, both the eNB and the UE work on one carrier. However, carrier bandwidth of a carrier in a future network may be very large, for example, up to 400 MHz. In particular, UE whose UL sending capability is limited or UE whose downlink receiving capability is limited probably can work only on a limited subband. Therefore, on a basis of a carrier or a cell, a "subband" concept is introduced to resource allocation for or reception of the UE. For example, this may include three cases described in a case 1 to a case 3 below.

Case 1: The UE may work on a plurality of subbands in both DL and UL.

Figure 5:
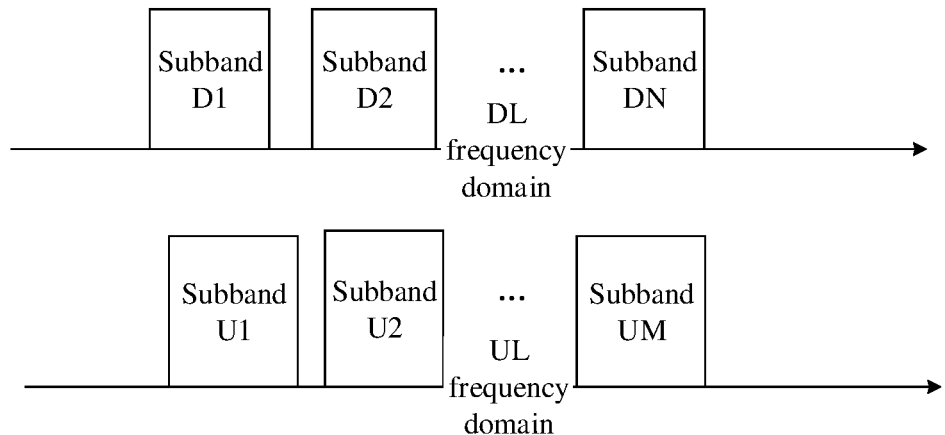
FIG. 5 is a schematic diagram of an uplink UL frequency domain and a downlink DL frequency domain.

FIG. 5 is a schematic diagram of a UL frequency domain and a DL frequency domain. In an application scenario shown in the case 1, a UL frequency domain of the UE includes one or more subbands, a DL frequency domain of the UE also includes one or more subbands, and there is one or more mapping relationships between the DL subband of the UE and the UL subband of the UE. The mapping relationship may include a one-to-one mapping relationship, or a one-to-many mapping relationship, or a many-to-one mapping relationship. The mapping relationship may be a predefined mapping relationship. The eNB may send the mapping relationship to the UE by using higher layer signaling, or send related configuration information to the UE by using higher layer signaling or in a pre-configuration manner. Then the UE dynamically selects one or more mapping relationships by using the DCI of the UE.

In the application scenario shown in the case 1, before determining the PUCCH resource based on the resource configuration information, the UE may first obtain a mapping relationship between the subband of the UL frequency domain and the subband of the DL frequency domain, and then determine a subband resource offset based on the mapping relationship, so as to determine the PUCCH resource based on the resource configuration information and the subband resource offset. It should be noted that the foregoing subband resource offset is used to determine an offset of a resource unit used in the subband of the UL frequency domain, where a limited quantity of RBs may be used as the resource unit, and a limited quantity of RBs may be used as the offset. During specific implementation, if there is a one-to-one mapping relationship between the subband of the DL frequency domain and the subband of the UL frequency domain, the subband resource offset may be null, and for calculation of a resource unit index value (for example, a CCE index) included in the resource configuration information, a corresponding index value may be obtained by using a downlink band as a set and using a unit of the calculation such that an index of a resource unit is all resource units in a downlink subband.

In addition, if a plurality of DL subbands are mapped to a same UL subband, the subband resource offset is not null and the subband resource offset is an offset related to a DL subband, used to determine an offset of a resource unit used in the UL subband.

Case 2: The UE may work on a plurality of subbands in UL.

Figure 6:
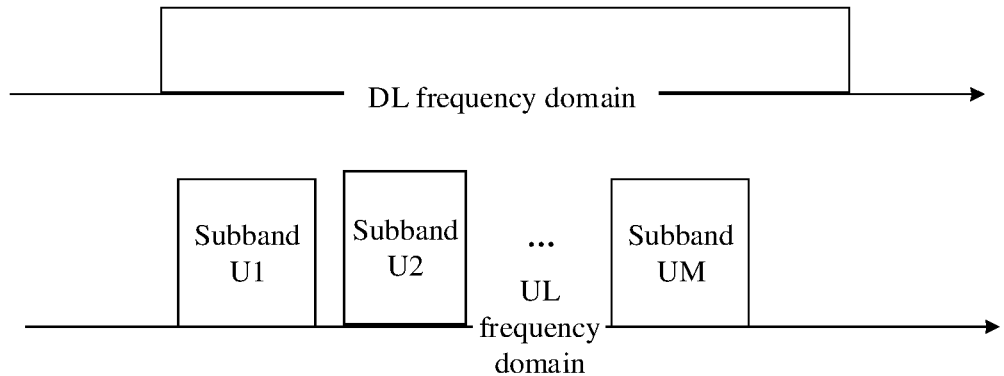
FIG. 6 is another schematic diagram of an uplink UL frequency domain and a downlink DL frequency domain.

FIG. 6 is another schematic diagram of a UL frequency domain and a DL frequency domain. In this case, the DL frequency domain may be divided into a plurality of subbands or not divided into subbands at all. This may be specifically determined based on an actual application scenario, and is not limited herein. In an application scenario shown in the case 2, the eNB configures, in advance for the UE, subband information of the UL frequency domain of the UE, and then the UE flexibly selects one UL subband by using the DCI of the UE. A PUCCH resource corresponding to an operating UL subband of the UE is calculated based on the following formulas and the resource configuration information. The UE may obtain subband configuration information sent by the eNB, and determine the operating UL subband of the UE based on the subband configuration information. Further, the UE may calculate, based on a predefined PUCCH resource calculation manner and the obtained resource unit offset, the PUCCH resource corresponding to the operating UL subband of the UE.

As shown in the following predefined PUCCH resource calculation manners, during the calculation of the PUCCH resource, a modulo operation needs to be performed on a resource unit offset corresponding to the subband. A specific modulo value may be a sum of a plurality of parameters.

A value is shifted, and then the modulo operation is performed. The specific modulo value may be a sum of a plurality of parameters.

$$n_{PUCCH}^{(k,p)} = \mod(n_{RU}, N_{subband}) + N_{PUCCH}^k + c \quad \text{Distributed} \quad (27)$$

$$n_{PUCCH}^{(k,p)} = \mod(n_{RU}, N_{PUCCH}^k, N_{subband}) + c \quad \text{Distributed} \quad (28)$$

$$n_{PUCCH}^{(k,p)} = \mod\left(\left\lfloor \frac{n_{RU,q}}{N_{RB}^{RU,q}} \right\rfloor N_{RB}^{RU,q}, N_{subband}\right) + \quad \text{Centralized} \quad (29)$$
$$N_{PUCCH}^k + c$$

$$n_{PUCCH}^{(k,p)} = \mod\left(\left\lfloor \frac{n_{RU,q}}{N_{RB}^{RU,q}} \right\rfloor N_{RB}^{RU,q} + N_{PUCCH}^k, \quad \text{Centralized} \quad (30)\right.$$
$$N_{subband}) + c$$

$$n_{PUCCH}^{(k,p)} = \mod(n_{RU,q}, N_{subband}) + N_{PUCCH}^k + c + \Delta_{offset} \quad (31)$$

$$n_{PUCCH}^{(k,p)} = \mod(n_{RU,q}, +N_{PUCCH}^k, N_{subband}) + c + \Delta_{offset} \quad (32)$$

$$n_{PUCCH}^{(k,p)} = \mod\left(\left\lfloor \frac{n_{RU,q}}{N_{RB}^{RU,q}} \right\rfloor N_{RB}^{RU,q}, N_{subband}\right) + N_{PUCCH}^k + c + \Delta_{offset} \quad (33)$$

$$n_{PUCCH}^{(k,p)} = \mod\left(\left\lfloor \frac{n_{RU,q}}{N_{RB}^{RU,q}} \right\rfloor N_{RB}^{RU,q} + N_{PUCCH}^k, N_{subband}\right) + c + \Delta_{offset} \quad (34)$$

For meanings of parameters in the expression 27 to the expression 34, refer to meanings of related parameters in the expression 1 to the expression 26. Details are not described herein again. Meanings of the related parameters in the expression 27 to the expression 34 and in the expression 1 to the expression 26 are not described herein again. In the expression 27 to the expression 34, $N_{subband}$ represents a quantity of resource units in one subband. $\Delta_{offset}$ is a variable related to a data transmission mode of the resource unit (RU). If control information corresponding to the RU is placed in a resource set, $\Delta_{offset}$ is an offset corresponding to the resource set, or is an offset related to a DCI control information format, and/or is an offset related to content of information carried by UCI of the PUCCH, or a finite combination of the foregoing offsets and/or offsets. It should be noted that, during specific implementation, a modulo operation may be alternatively performed for a calculation formula related to $f(\Delta_{SCS})$, for example, $n_{RU} + N_{PUCCH}^k + f(\Delta_{SCS})$, including the foregoing portion in which a variable c is added. In sum, the modulo operation may be a modulo operation on a sum of a limited quantity of parameters in all parameters in the foregoing formula, to calculate $n_{PUCCH}^{(k,p)}$.

Case 3: The UE may work on a plurality of subbands in DL.

Figure 7:
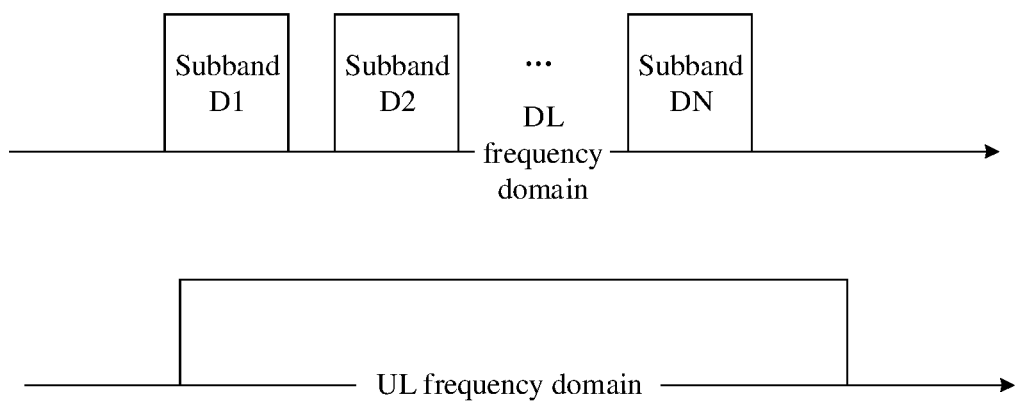
FIG. 7 is still another schematic diagram of an uplink UL frequency domain and a downlink DL frequency domain.

FIG. 7 is another schematic diagram of a UL frequency domain and a DL frequency domain. A DL frequency domain of the UE is divided into different subbands. If the UE uses a subband-based RU, that is, an RU index is a number related to a subband, RU numbers of different subbands are the same. In this case, an offset needs to be used for a PUCCH in the UL frequency domain, to differentiate offsets of the different subbands. A specific method includes the following.

A subband resource offset $\Delta_{subband\ 1}$ is given for each subband, and the UE may determine, based on an operating DL subband of the UE, a subband resource offset corresponding to the operating DL subband of the UE as the subband resource offset, and then determine a PUCCH resource corresponding to the operating DL subband of the UE with reference to $n_{RU}$. A UL frequency domain resource, corresponding to a subband i, of the UE is as follows:

$$n_{PUCCH}^{(k,p)} = n_{RU} + N_{PUCCH}^k + f(N_{subbandi}) + c \quad (35)$$

$$n_{PUCCH}^{(k,p)} = \left\lfloor \frac{n_{RU,q}}{N_{RB}^{RU,q}} \right\rfloor N_{RB}^{RU,q} + N_{PUCCH}^k + f(N_{subbandi}) + c \quad (36)$$

$$n_{PUCCH}^{(k,p)} = n_{RU,q} + N_{PUCCH}^k + f(N_{subbandi}) + c + \Delta_{offset} \quad (37)$$

$$n_{PUCCH}^{(k,p)} = \left\lfloor \frac{n_{RU,q}}{N_{RB}^{RU,q}} \right\rfloor N_{RB}^{RU,q} + N_{PUCCH}^k + f(N_{subbandi}) + c + \Delta_{offset} \quad (38)$$

For meanings of parameters in the expressions 35 to 38, refer to meanings of related parameters in the expression 1 to the expression 34. Details are not described herein again. Herein, a function $f$ is a function expression related to $N_{subbandi}$.

The foregoing offset is related to a function $f(\ )$, or the offset $N_{subbandi}$ is directly used. For example:

$$f(N_{subbandi}) = N_{subbandi}$$

A representation form of the function $f$ may include any one of four forms shown by an expression 39, an expression 40, an expression 41, and an expression 42 below, or expressions of more representation forms obtained by extending the following four expressions. This is not limited herein.

Similar formulas are as follows:

$$f(N_{subbandi}) = N_{subband_i} \quad (39)$$

$$f(N_{subbandi}) = N_{subband_{i-1}} \quad (40)$$

$$f(N_{subbandi}) = \sum_{j=1}^{j=1} N_{subbandj} \quad (41)$$

$$f(N_{subbandi}) = \sum_{j=1}^{j=i-1} N_{subbandj} \quad (42)$$

The expression 39 indicates that a value of the function $f$ may be determined by $N_{subbandi}$. The expression 40 indicates that a value of the function $f$ may be determined by $N_{subbandi-1}$. The expression 41 indicates that a value of the function $f$ may be determined by a cumulative value of $N_{subband1}$ to $N_{subbandi}$. The expression 42 indicates that a value of the function $f$ may be determined by a cumulative value of $N_{subband1}$ to $N_{subbandi-1}$.

It should be noted that the foregoing subband-related solutions may be used in combination with a solution in another embodiment.

In this way, the foregoing calculation formula is a formula into which a plurality of f( ) functions are introduced. Optionally, a subband-based modulo operation is performed on one or more parameters of this formula.

For example, the following calculation formulas are used:

$$n_{PUCCH}^{(k,p)} = \mod(n_{RU}, N_{subband}) + N_{PUCCH}^k + f(N_l) + c \quad \text{Distributed} \quad (43)$$

$$n_{PUCCH}^{(k,p)} = \mod(n_{RU}, N_{PUCCH}^k, N_{subband}) + f(N_l) + c \quad \text{Distributed} \quad (44)$$

-continued $$n_{PUCCH}^{(k,p)} = \text{mod}\left(\left\lfloor \frac{n_{RU,q}}{N_{RB}^{RU,q}} \right\rfloor N_{RB}^{RU,q}, N_{subband}\right) + \text{Centralized} \quad (45)$$
$$N_{PUCCH}^k + f(N_l) + c$$

$$n_{PUCCH}^{(k,p)} = \text{mod}\left(\left\lfloor \frac{n_{RU,q}}{N_{RB}^{RU,q}} \right\rfloor N_{RB}^{RU,q} + N_{PUCCH}^k, \text{Centralized} \right. \quad (46)$$
$$\left. N_{subband}\right) + f(N_l) + c$$

$$n_{PUCCH}^{(k,p)} = \text{mod}(n_{RU,q}, N_{subband}) + N_{PUCCH}^k + f(N_l) + c + \Delta_{offset} \quad (47)$$

$$n_{PUCCH}^{(k,p)} = \text{mod}(n_{RU,q}, +N_{PUCCH}^k, N_{subband}) + f(N_l) + c + \Delta_{offset} \quad (48)$$

$$n_{PUCCH}^{(k,p)} = \quad (49)$$
$$\text{mod}\left(\left\lfloor \frac{n_{RU,q}}{N_{RB}^{RU,q}} \right\rfloor N_{RB}^{RU,q}, N_{subband}\right) + N_{PUCCH}^k + f(N_l) + c + \Delta_{offset}$$

$$n_{PUCCH}^{(k,p)} = \quad (50)$$
$$\text{mod}\left(\left\lfloor \frac{n_{RU,q}}{N_{RB}^{RU,q}} \right\rfloor N_{RB}^{RU,q} + N_{PUCCH}^k, N_{subband}\right) + f(N_l) + c + \Delta_{offset}$$

In the foregoing formulas, a rounding-down operation may be alternatively a rounding or remainder operation, and correspondingly, a multiplied value may be adjusted accordingly. This may be specifically determined based on an actual application scenario, and is not limited herein.

The UE determines the subband resource offset based on the DL operating band of the UE, and determines, based on the resource configuration information (namely, a resource unit offset, for example, an nCCE), the PUCCH resource corresponding to the operating DL subband of the UE.

It should be noted that the subband of the DL frequency domain and/or the subband of the UL frequency domain may be obtained through allocation based on content of the UCI of the terminal device. For example, for a HARQ feedback of the UE, the feedback may be performed in a centralized manner in a subband, and CSI information is associated with a subband and fed back in a centralized manner in the subband.

Optionally, accumulation of resource unit index values of the UE in time domain is considered during the calculation. For example, an initial value of resource unit index values of a mini-slot is a value obtained after a last unit index value of a slot right before the mini-slot in time domain is incremented by 1, and for each resource unit index value of the mini-slot, the last resource unit index value of the slot right before the mini-slot in time domain needs to be added to an index value within the mini-slot, to obtain the value.

The UE works on limited bandwidth, and the limited bandwidth is less than carrier bandwidth. The foregoing subband may be a subband on the carrier bandwidth, or may be limited operating bandwidth of the UE. Bandwidth of the UE on one carrier and a subband may be inclusive of each other.

Herein, $n_{RU}$ is calculated based on the finite bandwidth, and then there is also a frequency domain offset, used to calculate the PUCCH resource.

The UE may choose to perform PUCCH frequency hopping on a subband. Slot-based subband frequency hopping means that a corresponding subband can be selected for each slot according to a particular rule, and/or subband frequency hopping based on a PUCCH control channel type means that the UE selects a corresponding subband on each PUCCH control channel. A selection criterion includes performing, based on an ID of the UE, a cell ID, a beam ID, slot information, and channel information, a modulo operation thereof, to select a proper subband. Alternatively, the frequency hopping is performed based on a specific subband-level offset.

Herein, $n_{RU}$ may be a $1^{st}$ index value of a resource unit in which the DCI is located, or may be a $j^{th}$ index value of a resource unit in which the DCI is located, where j is a natural number, or may be a quantity of resource units.

The DCI may be specific DCI of the UE, or may be DCI of a UE group, or may be specific DCI of a cell, or DCI of a common search space, or DCI of a non-common search space.

It should be noted that the frequency domain resource index may be a resource index set configured by using higher layer signaling, and the eNB dynamically selects one element from the resource index set based on the DCI of the UE, and delivers the element to the UE. Alternatively, the frequency domain resource index is a frequency domain resource index delivered by the eNB to the UE by using higher layer signaling. Alternatively, the UE may obtain the frequency domain resource index in another manner of communication with the eNB. This may be specifically determined based on an actual application scenario, and is not limited herein.

The data packet is one or more transport blocks, or one or more code blocks, or a combination of a transport block and a code block. Alternatively, the code block belongs to a transport block sent along with the code block, or a plurality of code blocks come from one transport block.

The resource configuration information obtained by the UE includes frequency domain resource index information, where the frequency domain resource index information includes frequency domain resource index information corresponding to the slot type information of the UE, or frequency domain resource index information corresponding to the time domain information and/or frequency domain information of the resource in which the downlink shared channel data packet of the UE is located, or frequency domain resource index information corresponding to the subband information. Then the UE determines the uplink control channel resource based on the frequency domain resource index information, including determining, by the UE, the uplink control channel resource based on the frequency domain resource index information and an offset related to an uplink control channel type.

Optionally, the UE determines the uplink control channel resource based on the frequency domain resource index information and the offset related to the uplink control channel type. Herein, the offset related to the uplink control channel type may be $N_{PUCCH}^k$.

The frequency domain resource index information may be frequency domain resource index information corresponding to the slot type information of the UE. The frequency domain resource index information may be frequency domain resource index information corresponding to the time domain information and/or frequency domain information of the resource in which the downlink shared channel data packet of the UE is located. The frequency domain resource index information may be frequency domain resource index information corresponding to the subband information. The frequency domain resource index information may be frequency domain resource index information corresponding to the time domain information and/or frequency domain information of the resource in which the downlink control information (DCI) is located. The frequency domain resource index information may be frequency domain resource index information corresponding to at least one of the following: frequency domain resource index information corresponding to the slot type information of the UE, or frequency domain resource index information corresponding to the time domain information and/or frequency domain information of the resource in which the downlink shared channel data packet of the UE is located, or frequency domain resource index information corresponding to the subband information. In this way, as the frequency domain resource index information corresponds to the specific slot type information of the UE, uplink UCI for corresponding downlink information in a slot and uplink UCI for corresponding downlink information in a mini-slot are fed back on different frequency domain resources, so that a collision caused by sending of the two pieces of uplink UCI on a same resource is avoided.

$$n_{PUCCH}^{(k,p)} = n_{RU} + N_{PUCCH}^{k} + c \tag{51}$$

$$n_{PUCCH}^{(k,p)} = \left[\frac{n_{RU,q}}{N_{RB}^{RU,q}}\right] N_{RB}^{RU,q} + N_{PUCCH}^{k} + c \tag{52}$$

$$n_{PUCCH}^{(k,p)} = n_{RU} + N_{PUCCH}^{k} + c + \Delta_{offset} \tag{53}$$

$$n_{PUCCH}^{(k,p)} = \left[\frac{n_{RU,q}}{N_{RB}^{RU,q}}\right] N_{RB}^{RU,q} + N_{PUCCH}^{k} + c + \Delta_{offset} \tag{54}$$

It should be noted that $n_{RU}$ or $n_{RU,q}$ may be the frequency domain resource index. The frequency domain resource index may be a resource index set configured by using higher layer signaling, and an access network device selects one element from the resource index set, and sends the element to the terminal device by using downlink control information. Alternatively, the frequency domain resource index is a frequency domain resource index delivered by the access network device to the terminal device by using higher layer signaling. Alternatively, the frequency domain resource index is a frequency domain resource index delivered by the access network device to the terminal device by using downlink control information. Alternatively, the terminal device may obtain the frequency domain resource index in another manner of communication with the access network device. This may be specifically determined based on an actual application scenario, and is not limited herein. The downlink control information is carried by first DCI (for example, DCI 1), or second DCI, or both first DCI (for example, DCI 1) and second DCI (for example, DCI 2).

In some feasible implementations, the resource configuration information includes code division multiplexing information. The code division multiplexing information includes a code division multiplexing resource corresponding to information about an orthogonal frequency division multiplexing (OFDM) symbol occupied by the DCI, or a code division multiplexing resource corresponding to a slot type of the UE. The code division multiplexing resource may include information about a reference signal sequence carrying the UCI, cyclic offset information of the sequence, and information about an orthogonal sequence used in time domain and/or frequency domain.

The UE may determine, based on the code division multiplexing information, a manner of sending the PUCCH.

In a code division multiplexing manner, two pieces of UCI that come from different slots or originally have a frequency domain collision with each other may use a same time domain resource and/or frequency domain resource, and the two pieces of UCI are kept orthogonal to each other by using the code division multiplexing manner. The code division may be used in a spatial division manner. Alternatively, one type of the code division multiplexing information or an index value corresponding to the code division multiplexing information is offset, or the like.

During specific implementation, the resource configuration information includes code division multiplexing information corresponding to the information about the OFDM symbol occupied by the DCI, or code division multiplexing information corresponding to information about a subcarrier spacing (subcarrier spacing, SCS) occupied by the DCI, or code division multiplexing information corresponding to information about an SCS in which the OFDM symbol occupied by the DCI is located. The UE may determine, based on the code division multiplexing information in any one of the foregoing representation forms, the PUCCH resource used for transmitting the UCI. During specific implementation, the code division multiplexing information corresponding to the information about the OFDM symbol occupied by the DCI may be specifically code division multiplexing information corresponding to each downlink OFDM symbol occupied by the DCI or a specified quantity of downlink OFDM symbols occupied by the DCI. For example, in a transmission mode shown in FIG. 2, the DCI of the UE occupies OFDM symbols included in a slot o of a subcarrier 1, and configuration may be performed in advance, so that first two OFDM symbols in the slot o correspond to one Nl (for example, an Nl 1), and two OFDM symbols included in a mini-slot of the slot o correspond to another Nl (for example, an Nl 2). Then the Nl 1 or the Nl 2 is a resource offset of code division multiplexing information corresponding to the downlink OFDM symbol. The Nl 1 or the Nl 2 is a resource offset of code division multiplexing information corresponding to two OFDM symbols, or the like. During specific implementation, alternatively, configuration may be performed so that each OFDM symbol corresponds to one PUCCH resource offset, that is, each OFDM symbol corresponds to one Nl.

Alternatively, the information about the OFDM symbol occupied by the DCI may be code division multiplexing information corresponding to a type of a slot occupied by the DCI. During specific implementation, the code division multiplexing information corresponding to the type of the slot occupied by the DCI may be specifically code division multiplexing information corresponding to each type of slot occupied by the DCI. For example, in a transmission mode shown in FIG. 2, the DCI of the UE occupies a resource in a slot o of a subcarrier 1, and a data packet is sent by using the resource in the slot o, where the resource corresponds to one Nl (for example, an Nl 1), and two OFDM symbols included in a mini-slot of the slot o correspond to another Nl (for example, an Nl 2). Then the Nl 1 and the Nl 2 are resource offsets of code division multiplexing information corresponding to two types of slots occupied by the DCI. The Nl 1 and the Nl 2 are resource offsets of code division multiplexing information corresponding to two slot types. Optionally, the two slot types corresponding to the Nl 1 and the Nl 2 may be the same or different. Optionally, the two slot types corresponding to the Nl 1 and the Nl 2 occupy different time domain and/or frequency domain resources. Optionally, time domain resources, to which the two slot types corresponding to the Nl 1 and the Nl 2 may correspond, may be overlapping or non-overlapping. Optionally, the two slot types corresponding to the Nl 1 and the Nl 2 may occupy a same slot or different slots. The foregoing slot types and a case of a resource occupied by each slot type may be a combination of the foregoing optional solutions, and may be specifically determined according to a requirement in an actual application scenario. This is not limited herein.

Implementation 2

In some feasible implementations, the UE receives a PDSCH data packet sent by the eNB. Because the UE has a limited processing capability, if the eNB expects the UE to send UCI to the eNB as soon as possible, an effective timing constraint between the eNB and the UE is required. PUCCH resource configuration information sent by the eNB or preconfigured PUCCH resource configuration information may be notified in an implicit mapping manner to the UE, or may be notified in an explicit manner to the UE. This may be specifically determined based on an actual application scenario, and is not limited herein.

When notified in the implicit mapping manner to the UE, the resource configuration information may include indication information for searching for a PUCCH. For example, 1-bit information is used in DCI, to instruct, for a current transport block (TB) to feed back the UCI, to transmit the UCI by using a PUCCH closest to a current moment. The PUCCH may be a long PUCCH or a short PUCCH, and is specifically not limited, or the UE is notified in another manner, and this is not limited herein. The UE searches, based on the indication information, for a PUCCH resource that is closest to a current moment and after the current moment and that satisfies a channel requirement, and determines a found PUCCH resource as the PUCCH resource used for transmitting the UCI.

The current moment is a moment when the UE receives the DCI delivered by the eNB, or a moment when the UE parses out the PDSCH data packet. This is not limited herein.

In addition, in some feasible implementations, when notified in the implicit mapping manner to the UE, the resource configuration information may include a channel type of the PUCCH, where the channel type of the PUCCH includes a short PUCCH and/or a long PUCCH, and/or a channel in a specific PUCCH format, or a combination of the foregoing one or more channel types, and is not limited herein. For example, i-bit information is used in DCI, to instruct, for a current transport block (TB) or a current CB (code block) to feed back the UCI, to transmit the UCI by using a PUCCH closest to a current moment. The PUCCH may be a long PUCCH or a short PUCCH, and may be specifically determined by a channel type indication carried in the resource configuration information. The UE searches, based on the indication information, for a PUCCH resource that is closest to a current moment and after the current moment and that satisfies a requirement of the channel type, and determines a found PUCCH resource as the PUCCH resource used for transmitting the UCI.

It should be noted that a unit of the current moment may be a subframe, a slot, or a limited quantity of OFDM symbols in a slot.

Further, in some feasible implementations, x bits may be used in the DCI of the UE, to instruct to transmit the UCI by using a subsequent $k^{th}$ PUCCH. The subsequent $k^{th}$ PUCCH may be a PUCCH of any channel type, or may be a subsequent $k^{th}$ long PUCCH, or may be a subsequent $k^{th}$ short PUCCH, or may be a subsequent $k1^{th}$ long PUCCH and a subsequent $k2^{th}$ short PUCCH, where both k1 and k2 are less than k.

During specific implementation, the resource configuration information includes bit information of the PUCCH, and the UE may search, based on the bit information, a $k^{th}$ short PUCCH and/or a $k^{th}$ long PUCCH after a current moment, and determine a found short PUCCH and/or a found long PUCCH as a PUCCH used for transmitting the UCI. Further, the UE may alternatively begin to search, based on the bit information and starting from a start PUCCH at a current moment, for a $k^{th}$ short PUCCH and/or a $k^{th}$ long PUCCH as counted from the start PUCCH, and determine a found short PUCCH and/or a found long PUCCH as a PUCCH used for transmitting the UCI. A manner of determining the $k^{th}$ PUCCH may be determined based on an actual application scenario, and is not limited herein.

In some feasible implementations, if the eNB and the UE carry an enhanced mobile broadband (eMBB) service, and the eMBB service includes an ultra-high-definition video service, an augmented reality (AR) service, a virtual reality (VR) service, and the like, because major characteristics of the eMBB service include a large volume of transmitted data and a high transmission rate, a rate of data transmission between the eNB and the UE is relatively high. In other words, a data reception rate and a data feedback rate are also higher. The eNB sends a PDSCH data packet to the UE, and correspondingly, a HARQ process is generated for the UE to receive the data packet sent by the eNB. In this case, a time domain location at which the UE receives the data packet is a time domain location corresponding to the HARQ process. After receiving the data packet, the UE may further feed back, at a corresponding time domain location of a PUCCH, UCI of the data packet. The UE may determine, based on resource configuration information delivered by the eNB or preconfigured resource configuration information, the time domain location of the PUCCH at which the UCI of the data packet is to be fed back, and then may feed back the UCI of the data packet at the determined time domain location.

In some feasible implementations, the eNB may add related information used to determine a time domain location of a PUCCH to the resource configuration information, and deliver the related information to the UE by sending the resource configuration information to the UE, to trigger the UE to determine, based on the related information and information such as a time domain location at which a PDSCH data packet is received, a time domain location at which UCI of the PDSCH data packet is to be fed back. Alternatively, the eNB may trigger, by using higher layer signaling, the UE to determine, based on related information carried in preconfigured resource configuration information and information such as a time domain location at which a PDSCH data packet is received, a time domain location at which UCI of the PDSCH data packet is to be fed back. During specific implementation, when the related information that is carried in the resource configuration information and that is used to determine the time domain location of the PUCCH varies, the determining, by the UE, a time domain location at which UCI of the PDSCH data packet is to be fed back may vary and may specifically include a manner 1 to a manner 3 below.

Manner 1: The resource configuration information includes timing information of the following: a time domain location at which a first HARQ process receives a data packet, and a time domain location of a PUCCH at which UCI of the data packet is fed back. The first HARQ may be a specific reference HARQ process. It may be assumed that the data packet received by the first HARQ process is a data packet A (or a first data packet). There is a piece of information about timing between the time domain location at which the first HARQ process receives the data packet A and the time domain location of the PUCCH at which UCI of the data packet A is fed back. The timing information may be at least one of a subframe spacing, a slot spacing, or an OFDM symbol spacing, and is not limited herein.

Herein, the at least one of a subframe spacing, a slot spacing, or an OFDM symbol spacing specifically includes an OFDM symbol spacing, or a subframe spacing and a slot spacing, or a subframe spacing, a slot spacing, and an OFDM symbol spacing, or a slot spacing and an OFDM symbol spacing, or a subframe spacing and an OFDM symbol spacing.

During specific implementation, after the UE obtains the timing information carried in the resource configuration information, when the UE receives a data packet B (for example, a second data packet), the UE may determine, based on the timing information and information such as a time domain location at which a HARQ process (for example, a second HARQ process) receives the data packet B, a time domain location of a PUCCH at which UCI of the data packet B is to be fed back. Specifically, the time domain location at which the UE receives the data packet A and the time domain location at which the UE receives the data packet B are both known information, and the UE may determine, based on the time domain location (for example, a first time domain location) at which the first HARQ process receives the data packet A and the timing information, a time domain location of a PUCCH at which UCI of the data packet A is fed back. Further, the UE may use a difference between the time domain location at which the first HARQ process receives the data packet and the time domain location at which the second HARQ process receives the data packet, as a difference between the time domain location of the PUCCH at which the UCI of the data packet A is fed back and the time domain location of the PUCCH at which the UCI of the data packet B is to be fed back. After determining the time domain location of the PUCCH at which the UCI of the data packet A is fed back, the UE may determine, based on the difference, the time domain location of the PUCCH at which the UCI of the data packet B is to be fed back.

In the implementation described in the manner 1, the UE uses timing information (for example, first timing information) of a time domain location at which a reference HARQ process receives a data packet and a time domain location of a PUCCH at which UCI of the data packet is fed back as a reference timing relationship. The reference timing relationship may be used as information (for example, second timing information) about timing between a time domain location at which a subsequent HARQ process receives a new data packet and a time domain location of a PUCCH at which UCI of the new data packet is to be fed back. For example, the second timing information is the same as the first timing information.

Manner 2: The resource configuration information includes a reference timing relationship between a time domain location at which a PDSCH data packet is received and a time domain location of a PUCCH at which UCI of the PDSCH data packet is fed back. The reference timing relationship is used to indicate a time domain location of an uplink control channel (for example, a PUCCH) at which UCI of a downlink shared channel data packet (for example, a PDSCH data packet) is fed back and that is corresponding to a time domain location at which a HARQ process receives the downlink shared channel data packet.

It should be noted that the reference timing relationship is a time domain location relationship between a time domain location at which a specified HARQ process receives a downlink shared channel data packet and a time domain location of an uplink control channel at which UCI of the downlink shared channel data packet is fed back, where the specified HARQ process is a preconfigured HARQ process, or a HARQ process that is indicated by a HARQ identity ID sent by an access network device.

The reference timing relationship may be applied to any HARQ process. In other words, there is a same difference between a time domain location at which each HARQ process receives a data packet and a time domain location of a PUCCH at which UCI of the data packet is fed back.

During specific implementation, after the UE obtains the resource configuration information, when the UE receives a new data packet, the UE may determine, based on a time domain location at which the new data packet is received and the reference timing relationship, a time domain location of a PUCCH at which UCI of the new data packet is to be fed back.

The reference timing relationship may be at least one of a subframe spacing, a slot spacing, or an OFDM symbol spacing, and is not limited herein.

Herein, the at least one of a subframe spacing, a slot spacing, or an OFDM symbol spacing specifically includes an OFDM symbol spacing, or a subframe spacing and a slot spacing, or a subframe spacing, a slot spacing, and an OFDM symbol spacing, or a slot spacing and an OFDM symbol spacing, or a subframe spacing and an OFDM symbol spacing.

Manner 3: The resource configuration information includes a reference timing relationship between a time domain location at which a PDSCH data packet is received and a PUCCH time domain location of a HARQ feedback of the PDSCH data packet. In addition, the resource configuration information further includes a preconfigured time domain location offset. Same as the foregoing manner 2, the reference timing relationship is used to indicate a time domain location of an uplink control channel at which UCI of a downlink shared channel data packet is fed back and that is corresponding to a time domain location at which a HARQ process receives the downlink shared channel data packet.

It should be noted that the reference timing relationship is a time domain location relationship between a time domain location at which a specified HARQ process receives a downlink shared channel data packet and a time domain location of an uplink control channel at which UCI of the downlink shared channel data packet is fed back, where the specified HARQ process is a preconfigured HARQ process, or a HARQ process that is indicated by a HARQ identity ID sent by an access network device.

The reference timing relationship may be applied to any HARQ process. Further, in the implementation described in the manner 3, when the UE receives a new data packet, a difference between a time domain location at which a HARQ process of the UE receives the new data packet and a time domain location of a PUCCH at which UCI of the new data packet is fed back is a sum of the difference indicated by the reference timing relationship and the time domain location offset. The time domain location offset may be an index set of time domain location offsets configured by using higher layer signaling, and the eNB dynamically selects one element from the index set based on the DCI of the UE, and delivers the element to the UE. Alternatively, the time domain location offset may be a time domain location offset delivered by the eNB to the UE by using higher layer signaling. Alternatively, the UE may obtain the time domain location offset in another manner of communication with the eNB. This may be specifically determined based on an actual application scenario, and is not limited herein.

During specific implementation, the UE obtains the resource configuration information, and then may determine, based on the reference timing relationship and the time domain location offset, a difference between a time domain location at which a HARQ process receives a data packet and a time domain location of a PUCCH at which UCI of the data packet is fed back. Further, when the UE receives a new data packet, the UE may determine, based on a time domain location at which the new data packet is received and the determined difference, a time domain location of a PUCCH at which UCI of the new data packet is to be fed back.

Further, in some feasible implementations, the information included in the resource configuration information may be information such as a HARQ identity (ID), where a time domain location of a PUCCH of UCI is associated with a HARQ ID, so that the time domain location of the PUCCH of the UCI may be indicated by the HARQ ID. The UE may determine, as the PUCCH resource used for transmitting the UCI, a time domain location of a PUCCH of a HARQ process indicated by the HARQ ID carried in the resource configuration information. For example, if an ultra-reliable and low latency communications (URLLC) service of a bursty mini-slot exists in an eMBB service of a slot (for example, a slot o), the resource configuration information may be used to indicate that a same PUCCH time domain location may be used for both a HARQ process (for example, a HARQ process 1) corresponding to the mini-slot and a HARQ process (for example, a HARQ process 2) corresponding to the slot o. In this case, the resource configuration information may carry a HARQ ID of the HARQ process 2, to trigger the UE to transmit UCI at a time domain location of a PUCCH corresponding to the HARQ process 2.

Alternatively, the resource configuration information may be carried in DCI information of the HARQ process 2, and is not limited herein.

The time domain location offset in the present disclosure includes one or a combination of the following: a slot-based offset, an OFDM-symbol-based offset, and a subframe-based offset.

In this embodiment of the present disclosure, information about a time domain location in a slot or a subframe may further include one of the following cases: time domain location information of the slot and an OFDM symbol in the slot, time domain location information of the subframe and an OFDM symbol in the subframe, time domain location information of an OFDM symbol in the subframe, time domain location information of an OFDM symbol in the slot, and time domain location information of the subframe, a slot in the subframe, and an OFDM symbol in the slot, and further includes one of the following cases: time domain location information of the slot, time domain location information of the subframe, and time domain location information of the subframe and the slot.

Implementation 3

Figure 8:
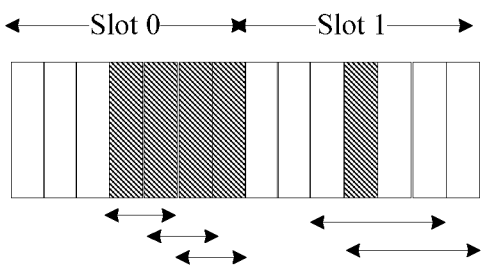
FIG. 8 is a schematic diagram of an OFDM symbol according to an embodiment of the present disclosure.

In some feasible implementations, after obtaining the resource configuration information of the uplink control channel, the UE may alternatively determine, based on the resource configuration information, information about a time domain location in a slot or a subframe in which the uplink control channel is located. Specifically, considering a type of each slot of the UE, the eNB notifies the UE in advance. In other words, the UE learns of in advance a specific quantity of UL OFDM symbols in each slot. Therefore, all possible locations of a PUCCH whose length is L are represented by using bit information, where a value of a bit represents a possible case, and length information of the PUCCH is sent to the UE by using other signaling, or the length L is also incorporated into the bit information to represent a range. For example, UL occupies most of the following subframe types: Three optional locations are available for a short PUCCH whose length is two OFDM symbols (OS) in a slot o, and may be represented by a two-bit code, and two optional locations are available for a long PUCCH whose length is four OSs in a slot 1, and may be represented by a one-bit code. For example, FIG. 8 is a schematic diagram of an OFDM symbol according to an embodiment of the present disclosure. As shown in FIG. 8, it is assumed that UL occupies four OSs (a gray portion) in seven OSs of a slot o, where there are three optional locations for a length of two OSs, for example, first two OSs, middle two OSs, or last two OSs in the four OSs marked in gray for the slot o in FIG. 8. The UD occupies five OSs (a gray portion) in seven OSs of a slot 1, where there are two optional locations for a length of four OSs, for example, first four OSs or last four OSs in the five OSs marked in gray for the slot 1 in FIG. 8. Further, locations of PUCCHs of different lengths within one slot may form one PUCCH location set, and bits are used to represent a code of each case in the set. In other words, the PUCCH location set includes a plurality of PUCCH location elements, and each PUCCH location element represents a time domain location and/or a frequency domain location of one PUCCH. The time domain location of the PUCCH represented by each PUCCH location element may include a time domain location of a short PUCCH or a time domain location of a long PUCCH. For example, in a slot, there are a total of three locations for a PUCCH whose length is two OSs, a total of four locations for a PUCCH whose length is one OS, and a total of one location for a PUCCH whose length is four OSs, totaling eight locations, and three bits may be used to represent a PUCCH location set. The foregoing PUCCH location set includes eight elements, and each element represents a location of one PUCCH. For example, ooo may represent a specific location of a PUCCH whose length is L in a slot, for example, a $1^{st}$ OFDM symbol in a slot o.

After obtaining bit indication information included in the resource configuration information, the UE may search, based on the bit indication information, a predefined or preconfigured PUCCH location set for a PUCCH time domain location and/or a PUCCH frequency domain location indicated by the bit indication information, and determine a found PUCCH time domain location and/or a found PUCCH frequency domain location as the PUCCH resource used for transmitting the UCI.

In the foregoing implementation, the eNB uses the bit information to indicate time domain locations of PUCCHs of various lengths in a slot, and uses one PUCCH location set for the indication, thereby reducing DCI data to be used during PUCCH resource location configuration and improving effective utilization of DCI data.

In the foregoing implementation, the eNB uses the bit information to indicate frequency domain locations of PUCCHs of various lengths in a slot, and uses one PUCCH location set for the indication, thereby reducing DCI data to be used during PUCCH resource location configuration and improving effective utilization of DCI data.

In the foregoing implementation, the eNB uses the bit information to indicate time domain locations and frequency domain locations of PUCCHs of various lengths in a slot, and uses one PUCCH location set for the indication, thereby reducing DCI data to be used during PUCCH resource location configuration and improving effective utilization of DCI data.

The bit indication information may be sent to the UE by using higher layer signaling, or sent to the UE by using DCI, or sent to the UE in a manner in which a set is sent by using higher layer signaling and then one or more elements are selected from the set for DCI. The higher layer signaling in this embodiment of the present disclosure includes at least one of radio resource control (RRC) signaling, media access control (MAC) signaling, broadcast information, or system information.

In some feasible implementations, if a 5G communications system supports simultaneous sending of a PUCCH and a PUSCH, the resource configuration information may carry information about a resource occupied by a PUCCH on a PUSCH resource, and deliver the resource information to the UE. The resource information is used to instruct the UE to send UCI on a specified quantity of OFDM symbols at one end or at two ends of a frequency domain of the PUSCH resource, or used to instruct the UE to send UCI on all OFDM symbols at one end or at two ends of a frequency domain of the PUSCH resource.

It should be noted that a frequency domain resource at one end or at the two ends of the frequency domain of the PUSCH resource is a preconfigured frequency domain resource, or a frequency domain resource specified by the eNB, or a frequency domain resource that is obtained based on information and an offset, where the information is obtained based on DL DCI of the UE or data packet information, and may be in a most marginal frequency domain region of the PUSCH resource, or may be a specific gap away from a marginal frequency domain region. The specified quantity of OFDM symbols may be a limited quantity of OFDM symbols, where the limited quantity of OFDM symbols may be at one end or at the two ends of the frequency domain. Further, the limited quantity of OFDM symbols may be alternatively all OFDM symbols. This may be configured according to a requirement in an actual application scenario, and is not limited herein. A configuration manner may include configuration by using higher layer signaling, or indication by using DCI, or configuration in a manner combining higher layer signaling and DCI indication, or the like.

Further, a quantity of repetitions of a PUCCH format within the PUSCH resource may be alternatively configured, and the quantity of repetitions may be determined according to a requirement in an actual application scenario. A specific location at which repeated sending is performed includes a specific location of repeated sending in time domain and/or a specific location of repeated sending in frequency domain.

The limited quantity of OFDM symbols is not necessarily equal to a quantity of OFDM symbols of a PUSCH. A relationship between the OFDM symbols is related to a specific sending type and/or a format of the PUCCH.

Further, in some feasible implementations, the PUCCH may be alternatively outside a region of the PUSCH resource, and a specific frequency domain offset and a specific time domain offset may be determined by configuration information. Alternatively, the PUSCH resource is offset based on the PUCCH resource, and a specific frequency domain offset and a specific time domain offset may be determined by configuration information. In this way, an implementation is more flexible, so that for the PUCCH and the PUSCH, a corresponding sending resource can be flexibly selected based on an uplink data sending bandwidth capability of the UE and an interference status of the PUCCH and the PUSCH during practical use, with higher applicability.

In this embodiment of the present disclosure, the resource configuration information of the PUCCH may be delivered in a plurality of manners to the UE, and the UE may determine, based on the information carried in the resource configuration information, the time domain location and/or the frequency domain location of the PUCCH for sending the UCI. In this way, an operation is more flexible, and applicability is higher.

Figure 9:
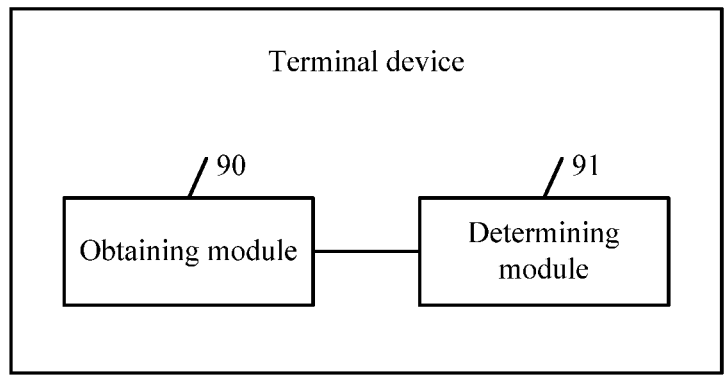
FIG. 9 is a schematic structural diagram of a terminal device according to an embodiment of the present disclosure.

FIG. 9 is a schematic structural diagram of a terminal device according to an embodiment of the present disclosure. The terminal device provided in this embodiment of the present disclosure may include an obtaining module 90, configured to obtain resource configuration information of an uplink control channel, where the resource configuration information includes a parameter corresponding to first information, the first information includes at least one of subband information of the terminal device and second information, and the second information includes at least one of the following information: time domain information and/or frequency domain information of a resource in which downlink control information (DCI) of the terminal device is located, slot type information of the terminal device, and time domain information and/or frequency domain information of a resource in which a downlink shared channel data packet of the terminal device is located, and a determining module 91, configured to determine an uplink control channel resource based on the resource configuration information obtained by the obtaining module 90, and send uplink control information on the uplink control channel resource.

Optionally, the resource configuration information includes resource offset information, and the resource offset information includes resource offset information corresponding to the time domain information and/or frequency domain information of the resource in which the DCI of the terminal device is located, and the determining module 91 is configured to determine the uplink control channel resource based on the resource offset information.

Optionally, the resource offset information corresponding to the time domain information and/or frequency domain information of the resource in which the DCI of the terminal device is located includes first resource offset information corresponding to information about an orthogonal frequency division multiplexing (OFDM) symbol occupied by the DCI, or second resource offset information corresponding to information about a subcarrier spacing (SCS) occupied by the DCI, or third resource offset information corresponding to information about an SCS in which an OFDM symbol occupied by the DCI is located.

Optionally, the resource configuration information includes resource offset information, and the resource offset information includes resource offset information corresponding to the slot type information of the terminal device, and the determining module 91 is configured to determine the uplink control channel resource based on the resource offset information.

Optionally, the resource configuration information includes resource offset information, and the resource offset information includes resource offset information corresponding to the time domain information and/or frequency domain information of the resource in which the downlink shared channel data packet of the terminal device is located, and the determining module 91 is configured to determine the uplink control channel resource based on the resource offset information.

Optionally, the determining module 91 is configured to obtain the resource offset based on the resource offset information, and determine the uplink control channel resource based on an index value of a resource unit carrying the DCI.

Optionally, the determining module 91 is configured to obtain the resource offset based on the resource offset information, and determine the uplink control channel resource based on a frequency domain resource index that is indicated by a access network device and that is of an uplink control channel used for transmitting UCI.

Optionally, the resource configuration information further includes frequency domain resource index information, where the frequency domain resource index information includes frequency domain resource index information corresponding to the slot type information of the terminal device, or frequency domain resource index information corresponding to the time domain information and/or frequency domain information of the resource in which the downlink shared channel data packet of the terminal device is located, or frequency domain resource index information corresponding to the subband information of the terminal device, and the determining module 91 is configured to determine the uplink control channel resource based on the frequency domain resource index information and an offset related to an uplink control channel type.

Optionally, the resource unit index value includes a resource unit index value of first DCI, or a resource unit index value of second DCI, where the DCI of the terminal device is carried by the first DCI and/or the second DCI.

Optionally, the resource unit index value includes a resource unit index value of a physical downlink shared channel PDSCH carrying the DCI of the terminal device, or a resource unit index value of a short PDSCH carrying the DCI, where the resource unit index value includes a system-level resource unit index value, or a subband-level resource unit index value.

Optionally, the resource unit index value is determined based on a resource unit index value of first DCI and a resource unit index value of second DCI, where the DCI of the terminal device is carried by the first DCI and/or the second DCI.

Optionally, the subband information of the terminal device includes information about at least one subband of an uplink UL frequency domain of the terminal device, and information about at least one subband of a downlink DL frequency domain of the terminal device, and the obtaining module 90 is further configured to obtain a mapping relationship between the subband of the UL frequency domain corresponding to the subband information and the subband of the DL frequency domain corresponding to the subband information, and determine an operating UL subband of the terminal device based on the mapping relationship obtained by the obtaining module.

Optionally, the obtaining module 90 is configured to determine a subband resource offset of the operating UL subband of the terminal device based on the mapping relationship, so as to determine the uplink control channel resource based on the resource configuration information and the subband resource offset, where the subband resource offset is used to determine an offset of a resource block RB used in the subband of the UL frequency domain.

Optionally, the obtaining module 90 is configured to if at least two subbands of the DL frequency domain are mapped to a same subband of the UL frequency domain, obtain a subband resource offset associated with a subband of the DL frequency domain.

Optionally, the subband information of the terminal device includes information about at least one subband of a UL frequency domain of the terminal device, and the obtaining module 90 is further configured to obtain preconfigured subband configuration information or subband configuration information sent by an access network device, and determine an operating UL subband of the terminal device based on the subband configuration information, and the determining module 91 is configured to determine, based on a predefined uplink control channel resource calculation manner and the resource configuration information, an uplink control channel resource corresponding to the operating UL subband of the terminal device.

Optionally, the subband information of the terminal device includes information about at least one subband of a DL frequency domain of the terminal device, and the determining module 91 is configured to determine a subband resource offset based on an operating DL subband of the terminal device, where the subband resource offset is used to determine a UL frequency domain resource corresponding to the operating DL subband of the terminal device, and determine, based on the resource configuration information and the subband resource offset, an uplink control channel resource corresponding to the operating DL subband of the terminal device.

Optionally, each subband included in the DL frequency domain of the terminal device corresponds to a subband resource offset, and the determining module 91 is configured to obtain a subband resource offset corresponding to the operating DL subband of the terminal device as the subband resource offset.

Optionally, each subband included in the DL frequency domain of the terminal device corresponds to a subband resource offset, and the determining module 91 is configured to obtain subband resource offsets of the operating DL subband of the terminal device and each subband before the operating DL subband of the terminal device in the DL frequency domain, and determine a cumulative value of the obtained subband resource offsets as the subband resource offset.

Optionally, the subband of the DL frequency domain and/or the subband of the UL frequency domain are/is obtained through allocation based on content of the UCI of the terminal device and/or a slot type of the terminal device.

Optionally, the resource configuration information further includes code division multiplexing information, where the code division multiplexing information includes a code division multiplexing resource corresponding to information about an orthogonal frequency division multiplexing (OFDM) symbol occupied by the DCI, or a code division multiplexing resource corresponding to a slot type of the terminal device, and the code division multiplexing resource includes one or a combination of the following: information about a reference signal sequence carrying the UCI, cyclic offset information of the reference signal sequence, and information about an orthogonal sequence used in time domain and/or frequency domain, and the determining module 91 is configured to determine, based on the code division multiplexing information, a manner of sending the uplink control channel resource.

During specific implementation, the terminal device described in this embodiment of the present disclosure may be the UE described in the foregoing embodiments. For an implementation of the terminal device described in this embodiment of the present disclosure, refer to the implementation performed by the UE in the foregoing embodiments. Details are not described herein again.

Figure 10:
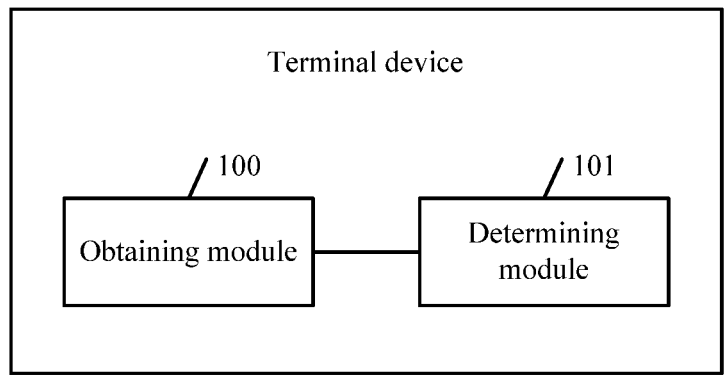
FIG. 10 is another schematic structural diagram of a terminal device according to an embodiment of the present disclosure.

FIG. 10 is another schematic structural diagram of a terminal device according to an embodiment of the present disclosure. The terminal device described in this embodiment of the present disclosure may include an obtaining module 100, configured to obtain resource configuration information of an uplink control channel, and a determining module 101, configured to determine, based on the resource configuration information obtained by the obtaining module 100, information about a time domain location in a slot or a subframe in which the uplink control channel is located.

Optionally, the resource configuration information includes indication information for searching for a PUCCH, and the determining module 101 is configured to search, based on the indication information, for an uplink control channel that is closest to a current moment and after the current moment and that satisfies a channel requirement, and determine a time domain location in a slot or a subframe in which the uplink control channel is located, where the current moment is a moment when the terminal device receives DCI delivered by an access network device, or a moment when the terminal device parses out a downlink shared channel data packet.

Optionally, the resource configuration information includes a channel type of the uplink control channel, and the channel type of the uplink control channel includes a short uplink control channel and/or a long uplink control channel, and the determining module 101 is configured to search for an uplink control channel that is closest to a current moment and after the current moment and that satisfies a requirement of the channel type, and determine a time domain location in a slot or a subframe in which a found short uplink control channel and/or a found long uplink control channel are/is located, where the current moment is a moment when the terminal device receives DCI delivered by an access network device, or a moment when the terminal device parses out a downlink shared channel data packet.

Optionally, the resource configuration information includes bit information of the uplink control channel, the bit information is used to indicate that an uplink control channel used for transmitting UCI is a $k^{th}$ uplink control channel, the $k^{th}$ uplink control channel includes a short uplink control channel and/or a long uplink control channel, and k is an integer greater than or equal to 1, and the determining module 101 is configured to search for a $k^{th}$ short uplink control channel and/or a $k^{th}$ long uplink control channel after or starting from a current moment, and determine a time domain location in a slot or a subframe in which a found short uplink control channel and/or a found long uplink control channel are/is located, where the current moment is a moment when the terminal device receives DCI delivered by an access network device, or a moment when the terminal device parses out a downlink shared channel data packet.

Optionally, the resource configuration information includes timing information of the following: a time domain location at which a first hybrid automatic repeat request (HARQ) process receives a downlink shared channel data packet, and a time domain location of an uplink control channel at which UCI of the downlink shared channel data packet is fed back, and the determining module 101 is configured to determine, based on the timing information and a first time domain location at which the first HARQ process receives a first downlink shared channel data packet, a time domain location of an uplink control channel at which UCI of the first downlink shared channel data packet is fed back, and determine a difference between the first time domain location and a second time domain location at which a second HARQ process receives a second downlink shared channel data packet, and determine, based on the difference and the time domain location of the uplink control channel at which the UCI of the first downlink shared channel data packet is fed back, a time domain location of an uplink control channel at which UCI of the second downlink shared channel data packet is to be fed back, as the information about the time domain location in the slot or the subframe in which the uplink control channel is located.

Optionally, the resource configuration information includes a reference timing relationship between a time domain location at which a downlink shared channel data packet is received and a time domain location of an uplink control channel at which UCI of the downlink shared channel data packet is fed back, where the reference timing relationship is used to indicate a time domain location of an uplink control channel at which UCI of a downlink shared channel data packet is fed back and that is corresponding to a time domain location at which a HARQ process receives the downlink shared channel data packet, and the determining module 101 is configured to determine a time domain location at which a downlink shared channel data packet is received, and determine, based on the reference timing relationship and the time domain location, a time domain location of an uplink control channel at which UCI of the downlink shared channel data packet is to be fed back, as the information about the time domain location in the slot or the subframe in which the uplink control channel is located.

Optionally, the resource configuration information includes a reference timing relationship between a time domain location at which a downlink shared channel data packet is received and a time domain location of an uplink control channel at which UCI of the downlink shared channel data packet is fed back, and a preconfigured time domain location offset or a time domain location offset sent by an access network device, where the reference timing relationship is used to indicate a time domain location of an uplink control channel at which UCI of a downlink shared channel data packet is fed back and that is corresponding to a time domain location at which a HARQ process receives the downlink shared channel data packet, and the determining module 101 is configured to determine a time domain location at which a downlink shared channel data packet is received, and determine, based on the reference timing relationship and the time domain location offset, a second time domain location of an uplink control channel at which UCI of the downlink shared channel data packet is to be fed back and that is corresponding to a first time domain location at which the downlink shared channel data packet is received, as the information about the time domain location in the slot or the subframe in which the uplink control channel is located.

Optionally, the reference timing relationship is a time domain location relationship between a time domain location at which a specified HARQ process receives a downlink shared channel data packet and a time domain location of an uplink control channel at which UCI of the downlink shared channel data packet is fed back, where the specified HARQ process is a preconfigured HARQ process, or a HARQ process that is indicated by a HARQ identity ID sent by an access network device.

Optionally, the resource configuration information further includes information about a hybrid automatic repeat request (HARQ) ID associated with time domain information of the uplink control channel for transmitting the UCI, and the determining module 101 is configured to determine time domain location information of an uplink control channel of a HARQ process indicated by the HARQ ID, as the information about the time domain location in the slot or the subframe in which the uplink control channel is located.

Optionally, the resource configuration information further includes bit indication information of the time domain location in the slot or the subframe in which the uplink control channel is located, and the determining module 101 is configured to search, based on the bit indication information, a preconfigured uplink control channel location set for the time domain location, indicated by the bit indication information, in the slot or the subframe in which the uplink control channel is located.

Optionally, the uplink control channel location set includes a time domain location and/or a frequency domain location of at least one uplink control channel of at least one slot, where a time domain location or a frequency domain location of each uplink control channel is represented by a PUCCH location element in the uplink control channel location set.

Optionally, the uplink control channel location set includes at least one uplink control channel location element, where each uplink control channel location element represents a time domain location and/or a frequency domain location of one uplink control channel, and a time domain location of the uplink control channel includes a time domain location of a short uplink control channel or a time domain location of a long uplink control channel.

During specific implementation, the terminal device described in this embodiment of the present disclosure may be the UE described in the foregoing embodiments. For an implementation of the terminal device described in this embodiment of the present disclosure, refer to the implementation performed by the UE in the foregoing embodiments. Details are not described herein again.

Figure 11:
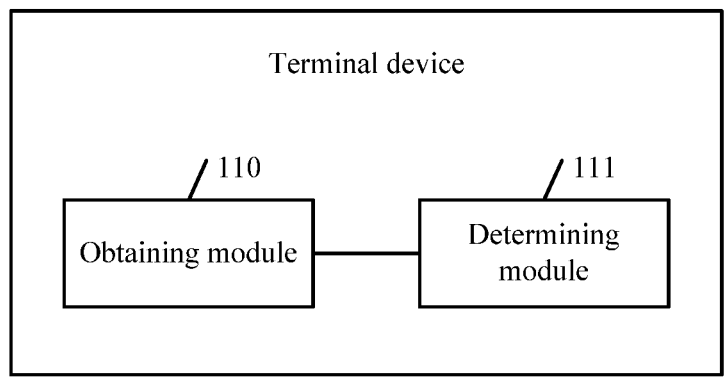
FIG. 11 is still another schematic structural diagram of a terminal device according to an embodiment of the present disclosure.

FIG. 11 is still another schematic structural diagram of a terminal device according to an embodiment of the present disclosure. The terminal device provided in this embodiment of the present disclosure includes an obtaining module 110, configured to obtain resource configuration information of an uplink control channel, where the resource configuration information includes information about a resource occupied by the uplink control channel on an uplink shared channel resource, and the resource information is used to instruct the terminal device to send uplink control information UCI on a specified quantity of orthogonal frequency division multiplexing (OFDM) symbols at one end or at two ends of a frequency domain of the uplink shared channel resource, or used to instruct the terminal device to send UCI on all OFDM symbols at one end or at two ends of a frequency domain of the uplink shared channel resource, and a determining module 111, configured to determine, based on the resource configuration information obtained by the obtaining module 110, information about a time domain location in a slot or a subframe in which the uplink control channel is located.

During specific implementation, the terminal device described in this embodiment of the present disclosure may be the UE described in the foregoing embodiments. For an implementation of the terminal device described in this embodiment of the present disclosure, refer to the implementation performed by the UE in the foregoing embodiments. Details are not described herein again.

Figure 12:
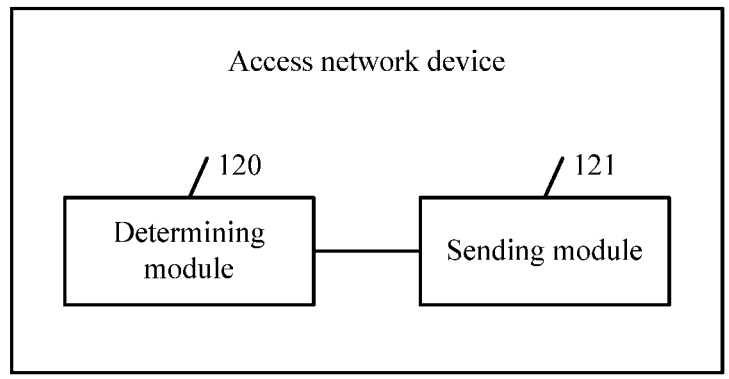
FIG. 12 is a schematic structural diagram of an access network device according to an embodiment of the present disclosure.

FIG. 12 is a schematic structural diagram of an access network device according to an embodiment of the present disclosure. The access network device provided in this embodiment of the present disclosure includes a determining module 120, configured to determine resource configuration information based on first information, and a sending module 121, configured to send the resource configuration information determined by the determining module 120 to a terminal device, where the resource configuration information is used to instruct the terminal device to determine an uplink control channel resource based on the resource configuration information, and send uplink control information on the uplink control channel resource.

The resource configuration information includes a parameter corresponding to the first information, the first information includes at least one of subband information of the terminal device and second information, and the second information includes at least one of the following information: time domain information and/or frequency domain information of a resource in which downlink control information (DCI) of the terminal device is located, slot type information of the terminal device, and time domain information and/or frequency domain information of a resource in which a downlink shared channel data packet of the terminal device is located.

Optionally, the resource configuration information includes resource offset information, and the resource offset information includes resource offset information corresponding to the time domain information and/or frequency domain information of the resource in which the DCI of the terminal device is located.

Optionally, the resource offset information corresponding to the time domain information and/or frequency domain information of the resource in which the DCI of the terminal device is located includes first resource offset information corresponding to information about an orthogonal frequency division multiplexing (OFDM) symbol occupied by the DCI, or second resource offset information corresponding to information about a subcarrier spacing (SCS) occupied by the DCI, or third resource offset information corresponding to information about an SCS in which an OFDM symbol occupied by the DCI is located.

Optionally, the resource configuration information includes resource offset information, and the resource offset information includes resource offset information corresponding to the slot type information of the terminal device.

Optionally, the resource configuration information includes resource offset information, and the resource offset information includes resource offset information corresponding to the time domain information and/or frequency domain information of the resource in which the downlink shared channel data packet of the terminal device is located.

Optionally, the sending module 121 is further configured to send, to the terminal device, a resource unit index value of a time domain resource of an uplink control channel used for transmitting UCI.

Optionally, the resource unit index value includes a resource unit index value of first DCI, or a resource unit index value of second DCI, where the DCI of the terminal device is carried by the first DCI and/or the second DCI.

Optionally, the resource unit index value includes a resource unit index value of a physical downlink shared channel PDSCH carrying the DCI of the terminal device, or a resource unit index value of a short PDSCH carrying the DCI, where the resource unit index value includes a system-level resource unit index value, or a subband-level resource unit index value.

Optionally, the resource unit index value is determined based on a resource unit index value of first DCI and a resource unit index value of second DCI, where the DCI of the terminal device is carried by the first DCI and/or the second DCI.

Optionally, the sending module 121 is further configured to send, to the terminal device, a resource unit index value of a frequency domain resource of an uplink control channel used for transmitting UCI.

Optionally, the frequency domain resource index information includes frequency domain resource index information corresponding to the slot type information of the terminal device, or frequency domain resource index information corresponding to the time domain information and/or frequency domain information of the resource in which the downlink shared channel data packet of the terminal device is located, or frequency domain resource index information corresponding to the subband information of the terminal device.

Optionally, the subband information of the terminal device includes information about at least one subband of an uplink UL frequency domain of the terminal device, and information about at least one subband of a downlink DL frequency domain of the terminal device.

Optionally, at least one mapping relationship is included between the subband of the UL frequency domain and the subband of the DL frequency domain, where the mapping relationship is used to determine an operating UL subband of the terminal device and a subband resource offset of the operating UL subband of the terminal device, where the subband resource offset is used to determine an offset of a resource block RB used in the subband of the UL frequency domain.

Optionally, the sending module 121 is further configured to send subband configuration information to the terminal device, where the subband configuration information is used to determine an operating UL subband of the terminal device.

Optionally, the subband configuration information includes a subband resource offset, where the subband resource offset is used to determine an uplink control channel resource corresponding to the operating DL subband of the terminal device.

Optionally, the subband resource offset includes a subband resource offset of at least one subband included in the DL frequency domain of the terminal device, where each subband included in the DL frequency domain of the terminal device corresponds to a subband resource offset.

Optionally, the subband of the DL frequency domain and/or the subband of the UL frequency domain are/is obtained through allocation based on content of the UCI of the terminal device and/or a slot type of the terminal device.

Optionally, the resource configuration information further includes code division multiplexing information, where the code division multiplexing information includes a code division multiplexing resource corresponding to information about an orthogonal frequency division multiplexing (OFDM) symbol occupied by the DCI, or a code division multiplexing resource corresponding to a slot type of the terminal device, and the code division multiplexing resource includes one or a combination of the following: information about a reference signal sequence carrying the UCI, cyclic offset information of the reference signal sequence, and information about an orthogonal sequence used in time domain and/or frequency domain.

Optionally, the resource configuration information includes indication information for searching for a PUCCH, and the indication information is used to instruct the terminal device to search for an uplink control channel that is closest to a current moment and after the current moment and that satisfies a channel requirement, and determine a time domain location in a slot or a subframe in which the uplink control channel is located, where the current moment is a moment when the terminal device receives DCI delivered by the access network device, or a moment when the terminal device parses out a downlink shared channel data packet.

Optionally, the resource configuration information includes a channel type of the uplink control channel, and the channel type of the uplink control channel includes a short uplink control channel and/or a long uplink control channel, and the resource configuration information is used to instruct the terminal device to search for an uplink control channel that is closest to a current moment and after the current moment and that satisfies a requirement of the channel type, and determine a time domain location in a slot or a subframe in which a found short uplink control channel and/or a found long uplink control channel are/is located, where the current moment is a moment when the terminal device receives DCI delivered by the access network device, or a moment when the terminal device parses out a downlink shared channel data packet.

Optionally, the resource configuration information includes bit information of the uplink control channel, the bit information is used to indicate that an uplink control channel used for transmitting UCI is a $k^{th}$ uplink control channel, the $k^{th}$ uplink control channel includes a short uplink control channel and/or a long uplink control channel, and k is an integer greater than or equal to 1, and the resource configuration information is used to instruct the terminal device to search for a $k^{th}$ short uplink control channel and/or a $k^{th}$ long uplink control channel after or starting from a current moment, and determine a time domain location in a slot or a subframe in which a found short uplink control channel and/or a found long uplink control channel are/is located, where the current moment is a moment when the terminal device receives DCI delivered by the access network device, or a moment when the terminal device parses out a downlink shared channel data packet. Optionally, the resource configuration information includes timing information of the following: a time domain location at which a first hybrid automatic repeat request (HARQ) process receives a downlink shared channel data packet, and a time domain location of an uplink control channel at which UCI of the downlink shared channel data packet is fed back.

Optionally, the resource configuration information includes a reference timing relationship between a time domain location at which a downlink shared channel data packet is received and a time domain location of an uplink control channel at which UCI of the downlink shared channel data packet is fed back, where the reference timing relationship is used to indicate a time domain location of an uplink control channel at which UCI of a downlink shared channel data packet is fed back and that is corresponding to a time domain location at which a HARQ process receives the downlink shared channel data packet.

Optionally, the resource configuration information includes a reference timing relationship between a time domain location at which a downlink shared channel data packet is received and a time domain location of an uplink control channel at which UCI of the downlink shared channel data packet is fed back, where the reference timing relationship is used to indicate a time domain location of an uplink control channel at which UCI of a downlink shared channel data packet is fed back and that is corresponding to a time domain location at which a HARQ process receives the downlink shared channel data packet, and the sending module 121 is further configured to send a time domain location offset to the terminal device, where the time domain location offset is used to instruct the terminal device to determine, based on the reference timing relationship and the time domain location offset, a time domain location of an uplink control channel at which UCI of a downlink shared channel data packet is to be fed back and that is corresponding to a time domain location at which the downlink shared channel data packet is received, as the information about the time domain location in the slot or the subframe in which the uplink control channel is located.

Optionally, the reference timing relationship is a time domain location relationship between a time domain location at which a specified HARQ process receives a downlink shared channel data packet and a time domain location of an uplink control channel at which UCI of the downlink shared channel data packet is fed back, where the specified HARQ process is a preconfigured HARQ process, or a HARQ process that is indicated by a HARQ identity ID sent by an access network device.

Optionally, the resource configuration information further includes information about a hybrid automatic repeat request (HARQ) ID associated with time domain information of the uplink control channel for transmitting the UCI, and the HARQ ID information is used to instruct the terminal device to determine time domain location information of an uplink control channel of a HARQ process indicated by the HARQ ID, as the information about the time domain location in the slot or the subframe in which the uplink control channel is located.

Optionally, the resource configuration information further includes bit indication information of the time domain location in the slot or the subframe in which the uplink control channel is located, and the bit indication information is used to instruct the terminal device to search a preconfigured uplink control channel location set for the time domain location, indicated by the bit indication information, in the slot or the subframe in which the uplink control channel is located.

Optionally, the uplink control channel location set includes a time domain location and/or a frequency domain location of at least one uplink control channel of at least one slot, where a time domain location or a frequency domain location of each uplink control channel is represented by an uplink control channel location element in the uplink control channel location set.

Optionally, the uplink control channel location set includes at least one uplink control channel location element, where each uplink control channel location element represents a time domain location and/or a frequency domain location of one uplink control channel, and a time domain location of the uplink control channel includes a time domain location of a short uplink control channel or a time domain location of a long uplink control channel.

Optionally, the resource configuration information includes information about a resource occupied by the uplink control channel on an uplink shared channel resource, and the resource information is used to instruct the terminal device to send uplink control information UCI on a specified quantity of orthogonal frequency division multiplexing (OFDM) symbols at one end or at two ends of a frequency domain of the uplink shared channel resource, or used to instruct the terminal device to send UCI on all OFDM symbols at one end or at two ends of a frequency domain of the uplink shared channel resource.

During specific implementation, the access network device described in this embodiment of the present disclosure may be the eNB described in the foregoing embodiments. For an implementation of the access network device described in this embodiment of the present disclosure, refer to the implementation performed by the eNB in the foregoing embodiments. Details are not described herein again.

Figure 13:
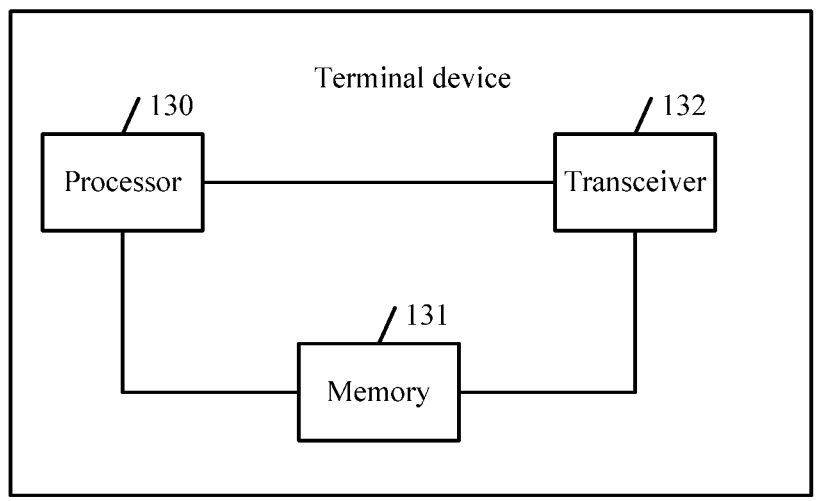
FIG. 13 is yet another schematic structural diagram of a terminal device according to an embodiment of the present disclosure.

FIG. 13 is yet another schematic structural diagram of a terminal device according to an embodiment of the present disclosure. The terminal device provided in this embodiment of the present disclosure may be specifically the UE in the foregoing embodiments, and may include a processor 130, a memory 131, and a transceiver 132.

The memory 131 includes but is not limited to a random access memory (RAM), a read-only memory (ROM), an erasable programmable read only memory (EPROM), or a compact disc read-only memory (CD-ROM). The memory 131 is configured to store a related instruction and data. The transceiver 132 is configured to receive and send data.

The processor 130 may be one or more central processing units (CPU). When the processor 130 is one CPU, the CPU may be a single-core CPU, or may be a multi-core CPU.

The transceiver 132 and the processor 130 are configured to read program code stored in the memory 131, to perform the implementation performed by the UE in the foregoing embodiments. Details are not described herein again.

Figure 14:
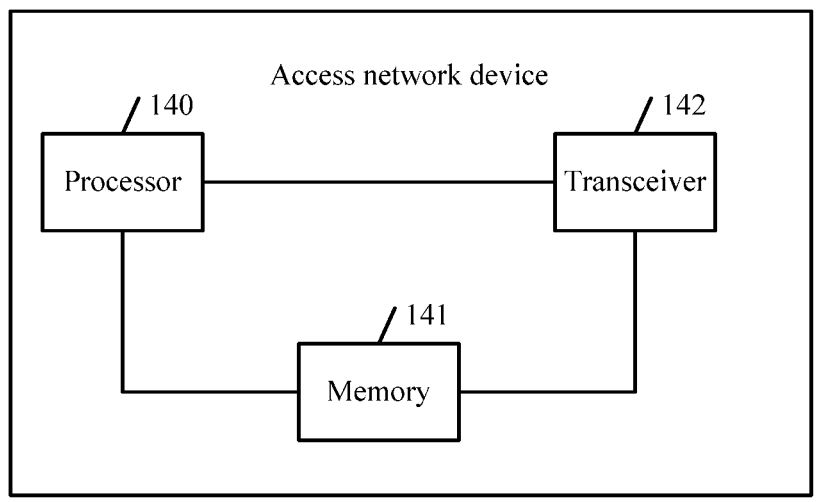
FIG. 14 is another schematic structural diagram of an access network device according to an embodiment of the present disclosure.

FIG. 14 is another schematic structural diagram of an access network device according to an embodiment of the present disclosure. The access network device provided in this embodiment of the present disclosure may be specifically the eNB in the foregoing embodiments, and may include a processor 140, a memory 141, and a transceiver 142.

The memory 141 includes but is not limited to a RAM, a ROM, an EPROM, or a CD-ROM. The memory 141 is used for a related instruction and data. The transceiver 142 is configured to receive and send data.

The processor 140 may be one or more CPUs. When the processor 140 is one CPU, the CPU may be a single-core CPU, or may be a multi-core CPU.

The transceiver 142 and the processor 140 are configured to read program code stored in the memory 141, to perform the implementation performed by the eNB in the foregoing embodiments. Details are not described herein again.

In this application, the terminal device may determine the uplink control channel resource based on the preconfigured resource configuration information or the resource configuration information sent by the access network device. This can improve association between the uplink control channel resource used for transmitting the UCI and the resource configuration information and reduce a probability of a collision in occupancy of the uplink control channel resource, thereby improving accuracy of UCI transmission and reducing signaling overheads in data transmission, with higher applicability. Furthermore, in this application, specific offsets of a frequency domain resource and a time domain resource may be determined by configuration information, or the uplink shared channel resource is offset based on the uplink control channel resource, and specific offsets of a frequency domain resource and a time domain resource may be determined by configuration information. In this way, an implementation is more flexible, so that a corresponding sending resource can be flexibly selected for the uplink control channel and the uplink shared channel based on an uplink data sending bandwidth capability of the terminal device and an interference status of the uplink control channel and the uplink shared channel during practical use, with higher applicability.

In this application, the resource configuration information of the uplink control channel may be delivered to the terminal device in a plurality of manners, and the terminal device may determine, based on the information carried in the resource configuration information, the time domain location and/or the frequency domain location of the uplink control channel for sending the UCI. In this way, an operation is more flexible, and applicability is higher.

What is claimed is:

1. An uplink control channel resource mapping method, comprising:
obtaining, by a terminal device, resource configuration information of a physical uplink control channel (PUCCH); and
determining, by the terminal device according to the resource configuration information, a time domain location in a slot in which a first PUCCH or a second PUCCH is located, wherein the resource configuration information comprises first configuration information of the first PUCCH and second configuration information of the second PUCCH, wherein the first configuration information indicates a quantity of OFDM symbols occupied by the first PUCCH in the slot and further indicates a location of the OFDM symbols occupied by the first PUCCH in the slot, wherein the second configuration information indicates a quantity of OFDM symbols occupied by the second PUCCH in the slot and further indicates a location of the OFDM symbols occupied by the second PUCCH in the slot, and wherein the quantity of OFDM symbols occupied by the first PUCCH is less than the quantity of OFDM symbols occupied by the second PUCCH.

2. The method according to claim 1, the quantity of OFDM symbols occupied by the first PUCCH in the slot is 1 or 2.

3. The method according to claim 1, the quantity of OFDM symbols occupied by the second PUCCH in the slot is 4 to 14.

4. The method according to claim 1, wherein the first configuration information is indicated by at least one first bit, and wherein the second configuration information is indicated by at least one second bit; and
wherein the determining the time domain location in the slot comprises:
determining, by the terminal device, the quantity of OFDM symbols occupied by the first PUCCH in the slot according to the at least one first bit and determining the quantity of OFDM symbols occupied by the second PUCCH in the slot according to the at least one second bit.

5. The method according to claim 1, wherein the first configuration information is indicated by at least one first bit, wherein the second configuration information is indicated by at least one second bit; and
wherein the determining the time domain location in the slot comprises:
determining, by the terminal device, the location of the OFDM symbols occupied by the first PUCCH in the slot according to the at least one first bit and determining the location of the OFDM symbols occupied by the second PUCCH in the slot according to the at least one second bit.

6. A terminal device, comprising:
a processor; and
a non-transitory-computer-readable storage medium storing a program to be executed by the processor, the program including instructions to:
obtain resource configuration information of a physical uplink control channel (PUCCH); and
determine, according to the resource configuration information, a time domain location in a slot in which a first PUCCH or a second PUCCH is located, wherein the resource configuration information comprises first configuration information of the first PUCCH and second configuration information of the second PUCCH, wherein the first configuration information indicates a quantity of OFDM symbols occupied by the first PUCCH in the slot and further indicates a location of the OFDM symbols occupied by the first PUCCH in the slot, wherein the second configuration information indicates a quantity of OFDM symbols occupied by the second PUCCH in the slot and further indicates a location of the OFDM symbols occupied by the second PUCCH in the slot, and wherein the quantity of OFDM symbols occupied by the first PUCCH is less than the quantity of OFDM symbols occupied by the second PUCCH.

7. The terminal device according to claim 6, the quantity of OFDM symbols occupied by the first PUCCH in the slot is 1 or 2.

8. The terminal device according to claim 6, the quantity of OFDM symbols occupied by the second PUCCH in the slot is 4 to 14.

9. The terminal device according to claim 6, wherein the first configuration information is indicated by at least one first bit, and wherein the second configuration information is indicated by at least one second bit; and
wherein the instructions to determine the time domain location in the slot include instructions to:
determine the quantity of OFDM symbols occupied by the first PUCCH in the slot according to the at least one first bit and determine the quantity of OFDM symbols occupied by the second PUCCH in the slot according to the at least one second bit.

10. The terminal device according to claim 6, wherein the first configuration information is indicated by at least one first bit, and wherein the second configuration information is indicated by at least one second bit; and
wherein the instructions to determine the time domain location in the slot include instructions to:
determine the location of OFDM symbols occupied by the first PUCCH in the slot according to the at least one first bit and determine the location of OFDM symbols occupied by the second PUCCH in the slot according to the at least one second bit.

11. An access network device, comprising:
a processor; and
a non-transitory computer-readable storage medium storing a program to be executed by the processor, the program including instructions to:
determine resource configuration information of a physical uplink control channel (PUCCH); and
send the resource configuration information to a terminal device, wherein the resource configuration information, indicates a time domain location in a slot in which a first PUCCH or a second PUCCH is located, wherein the resource configuration information comprises first configuration information of the first PUCCH and second configuration information of the second PUCCH, wherein the first configuration information indicates a quantity of OFDM symbols occupied by the first PUCCH in the slot and further indicates a location of OFDM symbols occupied by the first PUCCH in the slot, wherein the second configuration information indicates a quantity of OFDM symbols occupied by the second PUCCH in the slot and further indicates a location of OFDM symbols occupied by the second PUCCH in the slot, and wherein the quantity of OFDM symbols occupied by the first PUCCH is less than the quantity of OFDM symbols occupied by the second PUCCH.

12. The access network device according to claim 11, the quantity of OFDM symbols occupied by the first PUCCH in the slot is 1 or 2.

13. The access network device according to claim 11, the quantity of OFDM symbols occupied by the second PUCCH in the slot is 4 to 14.

14. The access network device according to claim 11, wherein the first resource configuration information is indicated by at least one first bit, and wherein the second configuration information is indicated by at least one second bit; and wherein the at least one first bit indicates the quantity of OFDM symbols occupied by the first PUCCH in the slot and wherein the at least one second bit indicates the quantity of OFDM symbols occupied by the second PUCCH in the slot.

15. The access network device according to claim 11, wherein the first resource configuration information is indicated by at least one first bit, and wherein the second configuration information is indicated by at least one second bit; and wherein the at least one first bit indicates the location of OFDM symbols occupied by the first PUCCH in the slot and wherein the at least one second bit indicates the location of OFDM symbols occupied by the second PUCCH in the slot.

\* \* \* \* \*